United States Patent
Beidas et al.

(10) Patent No.: US 9,634,870 B2
(45) Date of Patent: *Apr. 25, 2017

(54) OPTIMIZED RECEIVERS FOR FASTER THAN NYQUIST (FTN) TRANSMISSION RATES IN HIGH SPECTRAL EFFICIENCY SATELLITE SYSTEMS

(71) Applicant: Hughes Network Systems, LLC, Germantown, MD (US)

(72) Inventors: Bassel Beidas, Alexandria, VA (US); Rohit Iyer Seshadri, Gaithersburg, MD (US); Mustafa Eroz, Germantown, MD (US); Lin-Nan Lee, Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/007,149

(22) Filed: Jan. 26, 2016

(65) Prior Publication Data
US 2016/0164702 A1    Jun. 9, 2016

Related U.S. Application Data

(63) Continuation of application No. 14/319,090, filed on Jun. 30, 2014, now Pat. No. 9,246,717.

(51) Int. Cl.
*H04L 25/03* (2006.01)

(52) U.S. Cl.
CPC .. *H04L 25/03318* (2013.01); *H04L 25/03286* (2013.01); *H04L 2025/03611* (2013.01); *H04L 2025/03777* (2013.01)

(58) Field of Classification Search
CPC . H04L 1/0045; H04L 25/03; H04L 25/03006; H04L 25/03012;

(Continued)

(56) References Cited

U.S. PATENT DOCUMENTS 4,059,800 A    11/1977   Jones
5,134,464 A    7/1992    Basile et al.
(Continued)

FOREIGN PATENT DOCUMENTS

WO    WO2010049858 A2    5/2010

OTHER PUBLICATIONS

Barbieri, et al., "Improving the Spectral Efficiency of Linear Modulations Through Time-Frequency Packing", ISIT 2008, Toronto, Canada, Jul. 6-11, 2008, IEEE 978-1-4244-2571-6/08, Jul. 6, 2008.

(Continued)

*Primary Examiner* — Siu Lee
(74) *Attorney, Agent, or Firm* — Potomac Technology Law, LLC

(57) ABSTRACT

An approach is provided for increasing transmission throughput rates for a source signal transmitted over a wireless channel, applying faster-than-Nyquist (FTN) signaling rates combined with tight frequency roll-off to the a source signal. A receiver is provided that compensates for ISI effects induced by the FTN rate and tight frequency roll-off, where the complexity of the receiver grows only linearly with the interference memory. The receiver comprises an equalizer configured to compensate for the ISI effects, and a decoder configured to decode the output of the equalizer to determine and regenerate the source signal. The receiver processes the received signal via a plurality of processing iterations. For one processing iteration, the decoder generates a set of a posteriori soft information based on the output of the equalizer, and the equalizer uses the a posteriori soft information as a priori soft information for a subsequent processing iteration.

19 Claims, 14 Drawing Sheets

(58) Field of Classification Search
CPC ......... H04L 25/03178; H04L 25/03828; H04L 25/03834; H04L 25/03057; H04L 25/03038; H04B 1/06; H04B 1/10; H04B 1/16

See application file for complete search history.

(56) References Cited

U.S. PATENT DOCUMENTS

| | | | |
|---|---|---|---|
| 6,690,739 | B1 | 2/2004 | Mui |
| 7,106,813 | B1 | 9/2006 | Ling |
| 8,526,523 | B1 | 9/2013 | Eliaz |
| 8,553,821 | B1* | 10/2013 | Eliaz ............... H04L 25/03178 375/148 |
| 8,897,387 | B1 | 11/2014 | Eliaz |
| 8,917,786 | B1* | 12/2014 | von der Embse .... H04L 1/0047 375/260 |
| 8,995,572 | B1 | 3/2015 | Wu |
| 9,246,717 | B2* | 1/2016 | Beidas ............. H04L 25/03286 |
| 2001/0024474 | A1 | 9/2001 | Rakib et al. |
| 2001/0040926 | A1 | 11/2001 | Hannuksela et al. |
| 2002/0154620 | A1 | 10/2002 | Azenkot et al. |
| 2003/0033574 | A1 | 2/2003 | Vasic et al. |
| 2003/0095610 | A1 | 5/2003 | Liang et al. |
| 2005/0169164 | A1 | 8/2005 | Cannella et al. |
| 2008/0049848 | A1 | 2/2008 | Turnbull et al. |
| 2010/0183106 | A1 | 7/2010 | Beidas et al. |
| 2010/0208788 | A1 | 8/2010 | Azazzi et al. |
| 2011/0188550 | A1 | 8/2011 | Wajcer et al. |
| 2011/0234314 | A1 | 9/2011 | Kumar |
| 2011/0299572 | A1 | 12/2011 | Monsen et al. |
| 2012/0027132 | A1 | 2/2012 | Rouquette |
| 2012/0039247 | A1 | 2/2012 | Wajcer et al. |
| 2012/0039380 | A1* | 2/2012 | Schmitt ................ H04L 7/0062 375/232 |
| 2015/0110216 | A1* | 4/2015 | Bajcsy .................... H04B 1/40 375/285 |

OTHER PUBLICATIONS

Barbieri, et al., "Time-Frequency Packing for Linear Modulations: Spectral Efficiency and Practical Detection Schemes", IEEE Transactions on Communications, vol. 57, No. 10, Oct. 2009, IEEE 0090-6778/09, Oct. 2009.

Dasalukunte, "Multicarrier Faster-Than-Nyquist Signaling Transceivers", Lund University, Ph.D Thesis, Jan. 2012, Jan. 2012.

Hagenauer, "The Turbo Code Principle in Mobile Communications", International Symposium on Information Theory and Its Applications, Xi'an, PRC, Oct. 7-11, 2002, Oct. 7, 2002.

Leti, "Predistortion Techniques", Information Society Technologies, IST-2001-34561/LETI/WP3/R/PU/002, Jul. 30, 2004.

Modenini, et al., "How to Significantly Improve the Spectral Efficiency of Linear Modulations through Time-Frequency Packing and Advanced Processing", IEEE ICC 2012—Selected Areas in Communications Symposium, IEEE 978-1-4577-2053-6/12, Jun. 2012.

Piemontese, et al., "Improving the Spectral Efficiency of Nonlinear Satellite Systems through Time-Frequency Packing and Advanced Processing", arXiv:1301.4184v1 [cs.IT], Jan. 17, 2013.

Sklar, "A Primer on Turbo Code Concepts", IEEE Communications Magazine, Dec. 1997, IEEE 0163-6804/97, Dec. 1997.

USPTO, "International Search Report & Written Opinion", PCT App. No. PCT/US2014/045833, Oct. 7, 2014.

USPTO, "International Search Report & Written Opinion", PCT/US2014/059781, Dec. 17, 2014.

Vidal, et al., "Next Generation High Throughput Satellite System", First International IEEE-AESS Conference in Europe on Space and Satellite Telecommunications, Oct. 2-5, 2012, Rome, Italy., Oct. 2, 2012.

* cited by examiner

OPTIMIZED RECEIVERS FOR FASTER THAN NYQUIST (FTN) TRANSMISSION RATES IN HIGH SPECTRAL EFFICIENCY SATELLITE SYSTEMS

RELATED APPLICATIONS

This application is a continuation, and claims the benefit of priority under 35 U.S.C. §120, from U.S. application Ser. No. 14/319,090 (filed Jun. 30, 2014), the entirety of which is incorporated by reference herein.

BACKGROUND

Satellite communication systems must transmit signals over vast distances from earth to satellites in orbit and vice-versa. A communication system may include a transmitter having a high power amplifier (HPA) or a transponder that includes a transmitter having an HPA. The output of a transmitter can be seen as a sequence of symbols called a phrase. Each symbol represents a sequence of bits (e.g., in the case of 8PSK, each symbol represents 3 bits), and the transmitter will output the phrase one symbol at a time during transmission. As a transmitter shifts from one symbol to the next in the phrase, previous output symbols may cause interference in the output of the current symbol. This interference in the current symbol caused by previous symbols is referred to as the inter-symbol interference (ISI). ISI represents a form of signal distortion whereby one symbol interferes with subsequent symbols. ISI is usually caused by multipath propagation, or the inherent non-linear frequency response of a channel causing successive symbols to blur together. Further, typically, an HPA operates most efficiently at or near saturation, however, operation of an HPA at or near saturation contributes to the ISI in output channels. ISI can be mitigated by reducing the transmission or throughput rate of the transmitter, however, a reduction in the throughput rate proportionately reduces bandwidth efficiency.

In order to increase system throughput, a logical goal would be to maximize the number of transponders/HPAs of the satellite transmission antenna. Due to physical limitations, however, there is a maximum number of HPA units that can fit in a single transponder. To combat this issue, multiple carriers can be shared by a single transponder HPA (multicarrier operation), allowing for the transmission of more data and the servicing more users without exceeding the physical limitation on the number of HPAs per transponder. Another benefit of multicarrier operation is that it facilitates a reduction of the transmission symbol rate per carrier without sacrificing system throughput, which greatly eases the burden on hardware implementation. In a multicarrier system, however, the amplification of multiple carriers by way of a single HPA (driven at or near its saturation point for maximum efficiency) generates a large amount of nonlinear interference, which further contributes to the issue of ISI.

Alternatively, in order to increase transmission throughput, the transmission rate or symbol rate (in the time domain) can be increased. Increasing the transmission throughput further exacerbates ISI issues. According to the Nyquist theorem, there is an ideal transmission limit (the Nyquist rate) beyond which the ambiguity in ability to resolve symbols at the receiver increases—the maximum number of code elements per second that could be unambiguously resolved at the receiver. Transmission at the Nyquist rate mitigates ISI, while increasing the transmission throughput above the Nyquist rate exacerbates the issues of ISI.

Further, in order to increase spectral efficiency, it is desirable to pack channels closer together in the frequency domain, which results in increased throughput (e.g., in bits/second/Hz, where the Hz reflects the distance between adjacent channels). The spectral efficiency, however, is constrained by the roll-off factor, which reflects the rate of slope or steepness of a transmission function with respect to frequency. The slower the roll-off rate (or the higher the roll-off percentage or factor) the further apart the adjacent channels must be placed to mitigate adjacent channel interference (ACI). ACI results from extraneous power picked up from a signal in an adjacent channel (e.g., one channel bleeds-over into an adjacent channel). Accordingly, the slower the roll-off rate of a channel, the higher the signal power that can be picked up by an adjacent channel. Therefore, there is an inherent tradeoff between roll-off rate and spectral efficiency.

In sum, to maximize bandwidth efficiency of a system, two goals are to increase transmission throughput of a transponder (transmission rate) in the time domain, and to increase the rate or steepness of the roll-off (operate at a decreased or minimized roll-off factor or percentage). As described above, however, an increase in the transmission throughput beyond certain levels and tightening the roll-off contributes to both ISI and ACI. More specifically, the resulting interference manifests itself as a structured interference, which is significant and extends for a relatively longer period in the time domain (the interference tends to linger in time over many symbols, resulting in a significant degradation in performance). At the receiver, in view of the lengthened period of significant interference, the receiver must be configured to handle the increased interference levels, which would require increased complexity in the receiver. The longer the interference memory, the receiver must account for the possible sequences, which is exponential in the symbol alphabet over that memory. For example, with a 16APSK modulation scheme, the receiver would be required to consider 16 raised to the power of the channel interference memory signal possibilities in the decoding process. In other words, the receiver must be configured to account for a significantly increased number of possibilities for the transmitted signal before making a decoder decision.

What is needed, therefore, is an approach for increasing the transmission throughput rate, combined with a tight frequency roll-off, for a source signal transmitted via a wireless transmitter or transponder, and a receiver of simplified complexity that employs compensation techniques for mitigating the ISI of the transmitted signal induced by the increased transmission rate and tight frequency roll-off.

SOME EXAMPLE EMBODIMENTS

The present invention advantageously addresses the needs above, as well as other needs, by providing an approach for increasing the transmission throughput rate (applying faster-than-Nyquist "FTN" signaling), combined with tight frequency roll-off, for a source signal transmitted via a wireless transmitter or transponder, and a receiver that employs compensation techniques (for mitigating the ISI of the transmitted signal induced by the increased transmission rate and tight frequency roll-off) of a complexity that grows only linearly with the interference memory.

In accordance with an example embodiment, an apparatus comprises a receiver module configured to process a signal received over a wireless channel, wherein the received signal reflects a source signal comprising a plurality of source symbols, and includes inter-symbol interference (ISI) effects induced based on a faster-than-Nyquist (FTN) signaling rate and a tight frequency roll-off applied to the source signal for transmission over the wireless channel. The receiver module comprises an equalizer module configured to compensate for the ISI effects induced based on the FTN signaling rate and the tight frequency roll-off applied to the source signal, a decoder module configured to decode an output of the equalizer module to determine and regenerate the source signal. By way of example, in compensating for the ISI effects induced by the FTN signaling rate and tight frequency roll-off, the equalizer module is configured to use a priori soft information of every code bit for a given carrier on which the source signal was transmitted, where the a priori soft information comprises log-likelihood ratios (LLRs). By way of further example, the decoder module is further configured to generate a set of a posteriori log-likelihood ratios (LLRs) based on the output of the equalizer module, and the a priori soft information used by the equalizer module comprises the a posteriori LLRs generated by the decoder module. By way of further example, in compensating for the ISI effects induced by the FTN signaling rate and tight frequency roll-off, the receiver module is configured to process the received signal via a plurality of processing iterations. For a one processing iteration, the decoder module is further configured to generate the set of a posteriori soft information based on the output of the equalizer module, and for a processing iteration subsequent to the one processing iteration, the a priori soft information used by the equalizer module comprises the a posteriori soft information generated by the decoder module for the one processing iteration.

In accordance with a further example embodiment, a method comprises processing a signal received over a wireless channel, wherein the received signal reflects a source signal comprising a plurality of source symbols, and includes inter-symbol interference (ISI) effects induced based on a faster-than-Nyquist (FTN) signaling rate and a tight frequency roll-off applied to the source signal for transmission over the wireless channel. The processing of the received signal comprises equalizing the received signal to compensate for the ISI effects induced based on the FTN signaling rate and the tight frequency roll-off applied to the source signal, decoding an output of the equalizing step to determine and regenerate the source signal. By way of example, in compensating for the ISI effects induced by the FTN signaling rate and tight frequency roll-off, the equalizing of the received signal comprises utilizing a priori soft information of every code bit for a given carrier on which the source signal was transmitted. By way of further example, the a priori soft information comprises log-likelihood ratios (LLRs). By way of further example, the decoding of the output of the equalizing step comprises generating a set of a posteriori log-likelihood ratios (LLRs) based on the output of the equalizing step, wherein the a priori soft information utilized in the equalizing step comprises the a posteriori LLRs generated by the decoding of the output of the equalizing step. By way of further example, in compensating for the ISI effects induced by the FTN signaling rate and tight frequency roll-off, the processing of the received signal comprises decoding the received signal via a plurality of processing iterations. For a one processing iteration, the decoding of the output of the equalizing step comprises generating the set of a posteriori soft information based on the output of the equalizing step. For a processing iteration subsequent to the one processing iteration, the a priori soft information utilized in the equalizing step comprises the a posteriori soft information generated by the decoding of the output of the equalizing step for the one processing iteration.

In accordance with yet a further example embodiment, a method comprises modulating and encoding a source signal for transmission over a wireless channel, wherein the source signal comprises a plurality of source symbols. By way of example, the modulation and encoding comprises applying a faster-than-Nyquist (FTN) signaling rate and a tight frequency roll-off to the source signal. By way of further example, the modulation comprises Quadrature Phase Shift Keying (QPSK), and the encoding comprises encoding based on a Low Density Parity Check (LDPC) code of a specific code rate. By way of further example, the modulation is based on an 8-ary, 1+7APSK signal constellation, including an outer ring with 7 bit positions, in accordance with certain bit labeling and [x, y] bit coordinate positions. By way of further example, the modulation is based on a 16-ary, 6+10APSK signal constellation, including an inner ring with 6 bit positions and an outer ring with 10 bit positions, in accordance with certain bit labeling and [x, y] bit coordinate positions. By way of further example, the modulation is based on a 32-ary, 4+12+16APSK signal constellation, including an inner ring with 4 bit positions, a middle ring with 12 bit positions and an outer ring with 16 bit positions, in accordance with certain bit labeling and [x, y] bit coordinate positions.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An approach for increasing the transmission throughput rate (applying faster-than-Nyquist "FTN" signaling), combined with tight frequency roll-off, for a source signal transmitted via a wireless transmitter or transponder, and a receiver that employs compensation techniques (for mitigating the ISI of the transmitted signal induced by the increased transmission rate and tight frequency roll-off) of a complexity that grows only linearly with the interference memory, is described. In the following description, for the purposes of explanation, numerous specific details are set forth in order to provide a thorough understanding of the invention. It is apparent, however, that the invention may be practiced without these specific details or with an equivalent arrangement. In other instances, well known structures and devices are shown in block diagram form in order to avoid unnecessarily obscuring the invention.

Figure 1A:
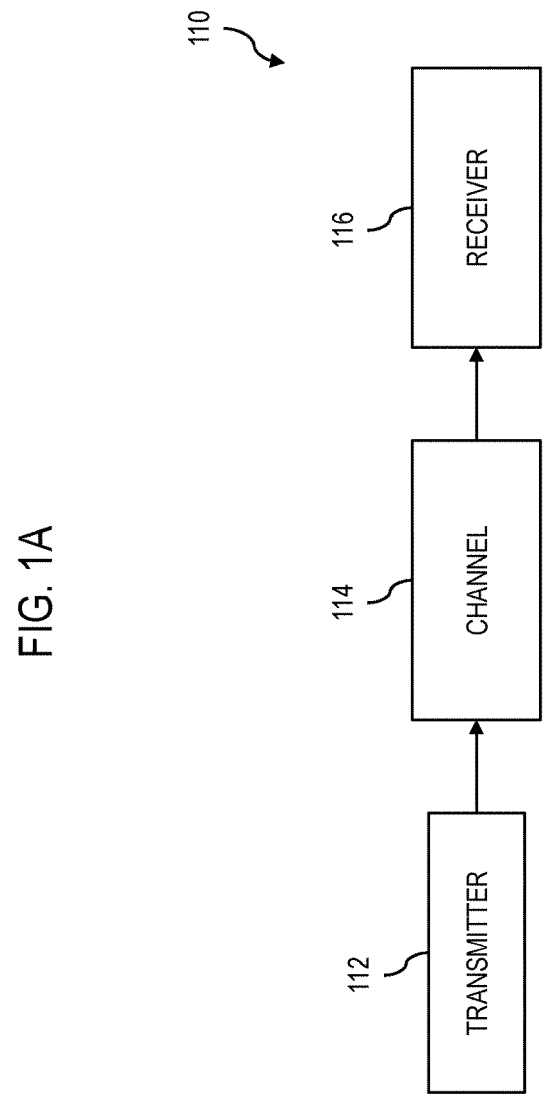
FIGS. 1A and 1B illustrate communications systems capable of employing an interference compensation system and algorithms, in accordance with example embodiments.

FIG. 1A illustrates a block diagram of a communications system capable of employing an interference compensation system and algorithms, in accordance with example embodiments. With reference to FIG. 1A, a broadband communications system 110 includes one or more transmitters 112 (of which one is shown) that generate signal waveforms across a communications channel 114 to one or more receivers 116 (of which one is shown). In this discrete communications system 110, the transmitter 112 has a signal source that produces a discrete set of data signals, where each of the data signals has a corresponding signal waveform. These signal waveforms are attenuated, or otherwise altered, by communications channel 114. Coding may be utilized to combat noise and other issues associated with the channel 114, such as forward error correction (FEC) codes.

Figure 1B:
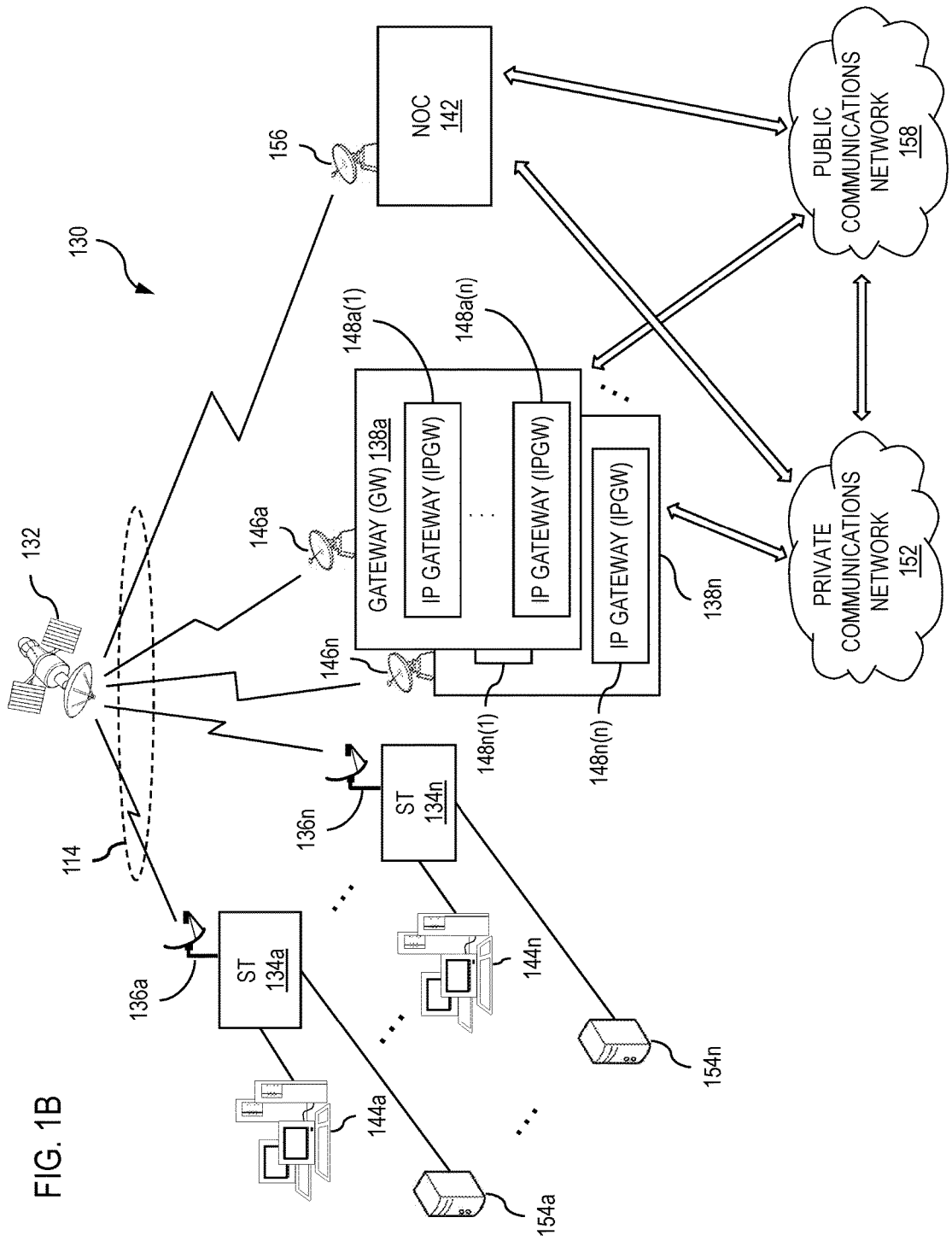

FIG. 1B illustrates an example satellite communications system 130 capable of supporting communications among terminals with varied capabilities, including an interference compensation system and algorithms, in accordance with example embodiments. Satellite communications system 130 includes a satellite 132 that supports communications among multiple satellite terminals (STs) 134a-134n, a number of gateways (GWs) 138a-138n, and a network operations center (NOC) 142. The STs, GWs and NOC transmit and receive signals via the antennas 136a-136n, 146a-146n, and 156, respectively. According to different embodiments, the NOC 142 may reside at a separate site reachable via a separate satellite channel or may reside within a GW site. The NOC 142 performs the management plane functions of the system 130, while the GWs 138a-138n perform the data plane functions of the system 133. For example, the NOC 142 performs such functions as network management and configuration, software downloads (e.g., to the STs 134a-134n), status monitoring, statistics functions (e.g., collection, aggregation and reporting), security functions (e.g., key generation, management and distribution), ST registration and authentication, and GW diversity management. The NOC 142 communicates with each GW via the satellite 132, or via a secure private communications network 152 (e.g., an IPsec tunnel over a dedicated link or a virtual private network (VPN) or IPsec tunnel through a public network, such as the Internet). It should be noted that, according to one example embodiment, the traffic classification approaches of embodiments of the present invention address classification of data traffic flowing through an aggregation point or node. Additionally, each GW and the NOC have connectivity to one or more public communications networks, such as the Internet or a PSTN.

According to a further example embodiment, each of the GWs 138a-138n include one or more IP gateways (IPGWs)—whereby the data plane functions are divided between a GW and its respective IPGWs. For example, GW 138a includes IPGWs 148a(1)-148a(n) and GW 138n includes IPGWs 148n(1)-148n(n). A GW may perform such functions as link layer and physical layer outroute coding and modulation (e.g., DVB-S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, and traffic restriction policy enforcement. Whereas, the IPGW may perform such functions as data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing. Further, a GW and respective IPGW may be collocated with the NOC 142. The STs 134a-134n provide connectivity to one or more hosts 144a-144n and/or routers 154a-154n, respectively. The Satellite communications system 130 may operate as a bent-pipe system, where the satellite essentially operates as a repeater or bent pipe. Alternatively, the system 130 may employ a switching or processing satellite supporting mesh communications (point-to-point communications directly between, for example, the two STs 134a and 134n).

In a bent-pipe system of an example embodiment, the satellite 132 operates as a repeater or bent pipe, and communications to and from the STs 134a-134n are transmitted over the satellite 132 to and from respective IPGWs associated with particular STs. Further, in a spot beam system, any one spot beam operates as a bent-pipe to geographic region covered by the beam. For example, each spot beam operates as a bent pipe communications channel to and from the STs and/or IPGW(s) within the geographic region covered by the beam. Accordingly, signal transmissions to the satellite are either from an ST and destined for an associated gateway, or from a gateway and destined for an associated ST. According to one embodiment, several GWs/IPGWs are distributed across the geographic region covered by all spot beams of the satellite 132, where, in a beam in which a GW (and respective IPGWs) are located, only the one GW (and no STs) occupies that beam. Further, each IPGW may serve as an aggregation node for a multitude of remote nodes or STs. The total number of GWs/IPGWs, and the geographic distribution of the GWs/IPGWs, depends on a number of factors, such as the total capacity of the satellite dedicated to data traffic, geographic traffic loading of the system (e.g., based on population densities and the geographic distribution of the STs), locations of available terrestrial data centers (e.g., terrestrial data trunks for access to public and private dedicated networks).

Figure 2:
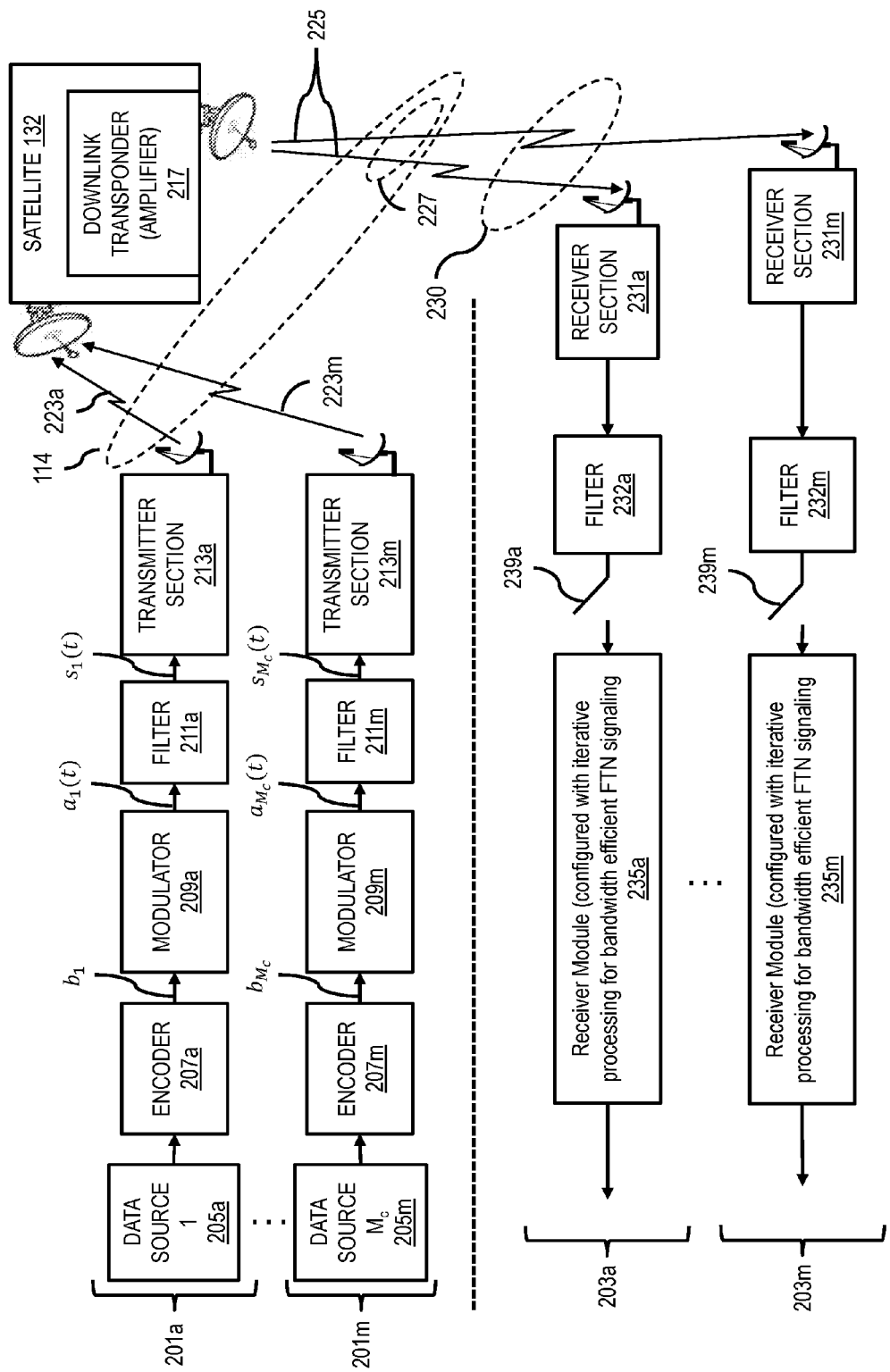
FIG. 2 illustrates a block diagram depicting an example transmitter and receiver of the communications system of FIG. 1A, in accordance with example embodiments of the present invention.

FIG. 2 illustrates a block diagram depicting an example transmitter and receiver of the communications system of FIG. 1A, in accordance with example embodiments of the present invention. While embodiments of the present invention are not limited to a satellite communications system, for the purpose of explanation, the following description envisions an embodiment encompassing the satellite communications system 130 of FIG. 1B. As illustrated in FIG. 2, the communication system includes transmitters 201 (201a-201m) and receivers 203 (203a-203m), with the signals being transmitted over the channel 114, via the transponder/amplifier 217, where the transponder/amplifier 217 comprises components of the transmission section of the satellite 132. The transmitters 201a-201m and receivers 203a-203m may represent a corresponding number of STs 134 and GWs 138. By way of example, a particular transmission 223a may reflect a transmission of data from a data source 205a (e.g., the host 144a), by the ST 134a, and destined for the GW 138a, where the receiver portion of the GW 138a may comprise the receiver 203a. A transmitter 201, in accordance with example embodiments, generally comprises at least one data or signal source 205, an encoder section 207, a modulator section 209, a filter section 211 and a transmitter section 213 (e.g., an upconverter/amplifier section). A receiver 203, in accordance with example embodiments, generally comprises a receiver section 231, a filter section 232, a sampler module 239, an equalizer section 233 (e.g., linear equalizers), a likelihood metric generator module 235, and a decoder section 237.

According to one example embodiment the satellite system comprises a bent-pipe system, where the satellite acts as a repeater (as described above). The transponder of such a communications satellite comprises a series of interconnected components that for a communications channel between the satellite receive and transmit antennas. At the receive side, a typical transponder generally comprises an input band limiting device (e.g., a band pass filter), an input low-noise amplifier (LNA) (which amplifies the received signal to compensate for the significant weakening of the signal due to large distance traveled between the earth station transmitter and the satellite), and an input multiplexer (IMUX) (which generally comprises filter banks that channelize the receive band into the individual channels). At the transmit side, a typical transponder generally comprises a frequency translator (which converts the frequency of the received signal to the frequency required for the transmitted signal), an output band limiting device (e.g., a band pass filter), and a downlink high power amplifier (HPA) (which amplifies the signal for transmission back down to an earth station receiver). In one embodiment, due to the physical limitations of the number of HPAs that can fit in the downlink transmission section of the satellite 132, to maximize bandwidth efficiencies (e.g., to increase bandwidth and data throughput), multiple received uplink channels or carrier signals can be multiplexed onto a single wideband carrier of a single downlink transponder HPA 217 (a wideband multi-carrier system). In such a multicarrier system, the downlink transponder will also include a signal combiner section or output multiplexer (OMUX), which combines the uplink transponder channels or carrier signals that are switched for transmission to a common downlink cell 230. The OMUX thereby generates a combined transmission signal for transmission via the HPA for the particular transmit signal or downlink beam 225.

Accordingly, in such a multi-carrier system, the satellite aggregates multiple received uplink data signals (e.g., data signals destined for a particular geographic region serviced by a particular downlink beam of the satellite), where each uplink data signal is carried by a separate carrier. The satellite simultaneously transmits the aggregate data signal over the single downlink channel 227 to the single downlink cell 230, which is transmitted via a single downlink transponder HPA 217, on a single downlink signal 225. During transmission over the downlink channel 227, the transmitted downlink signal 225 will encounter various physical effects that manifest as noise experienced in the received signal. The added channel noise typically may be idealized as additive white Gaussian noise. Hence, the transmitted signal 225 reflects multiple source data signals 223a-223m, respectively carrying data generated by the different data sources 205a-205m. While a variable number of data signals may be transmitted over the satellite 132 via such a multi-carrier system, however, for purposes of simplification, the following description envisions an embodiment encompassing data signals from two signal sources 205a and 205m, respectively transmitted via the uplink transmission signals 223a and 223m, and combined via the satellite and transmitted back via the downlink transmission signal 225.

According to an example embodiment, in operation, data or signal source 205a outputs a first source signal to encoder 207a, where the first source signal reflects a sequence of source data symbols for transmission over the communications system. Encoder 207a generates an encoded vector signal $b_1$ from the first source signal. In one embodiment, encoder 207a is an error correction encoder that adds information to reduce information loss at the receive section 203. Additionally, or alternatively, the encoder 207a interleaves data from the first source signal into the encoded vector signal. Modulator 209a receives the encoded vector signal and generates a modulated discrete signal $a_1(t)$, where each source symbol is mapped to a respective signal constellation point of the signal constellation of the applied modulation scheme. In one embodiment, modulators 209 are Gray-coded Quadrature Amplitude Modulation (QAM) modulators or Amplitude and Phase Shift Keyed (APSK) modulators (e.g., 8 APSK, 16 APSK or 32 APSK modulators). Accordingly, depending on the applied modulation scheme, each source symbol represents a number of source data bits, where (via the applied modulation) each source symbol is mapped to an associated signal constellation point and transmitted to the satellite via a common uplink transmission carrier. For example, with 16 APSK modulation, each of the 16 constellation points represents or corresponds to an arrangement of four source data bits (e.g., 0000, 0001, 0010, . . . 1111), and (via the applied modulation) each received data symbol is mapped to its corresponding or associated constellation point. In one embodiment, the discrete signal output of the modulator 209 (e.g., the modulated signal) may be represented as:

$$a_m(t) = \sum_{k=-\infty}^{\infty} a_{m,k}\delta(t - kT_s - \varepsilon_m T_s),$$

where $\{a_{m,k}; m=1, \ldots, M_c\}$ are sets of complex valued data symbols, $\delta(t)$ is the Dirac delta function, and $\varepsilon_m$ represents the normalized difference in signal arrival times.

Filter 211a receives the modulated discrete signal $a_1(t)$ and generates a continuous filtered signal $s_1(t)$ reflecting the data of the modulated discrete signal. In one embodiment, filter 211a is a pulse shaping filter with impulse responses $P_{m,T}(\tau)$ to generate the signal $s_m(t)$ as:

$$s_m(t) = \int_{-\infty}^{\infty} a_m(t-\tau)P_{m,T}(\tau)d\tau$$

Alternatively, in the discrete representation:

$$s_m(t) = \sum_{k=-\infty}^{\infty} a_{m,k} * p_{m,T}(t - k\tau T_s), \tau \leq 1$$

where $\{a_{m,k}; m=1, \ldots, M_c\}$ are sets of complex-valued data symbols, $p_{m,T}(t)$ are impulse responses of the pulse shaping filters, and $1/\tau$ is the transmission throughput rate. As specified above, in traditional communications systems (based on the Nyquist theorem) the rate $1/\tau$ is chosen as unity, which avoid ISI for pulses that are orthogonal to integral shifts of $T_s$.

Figure 3:
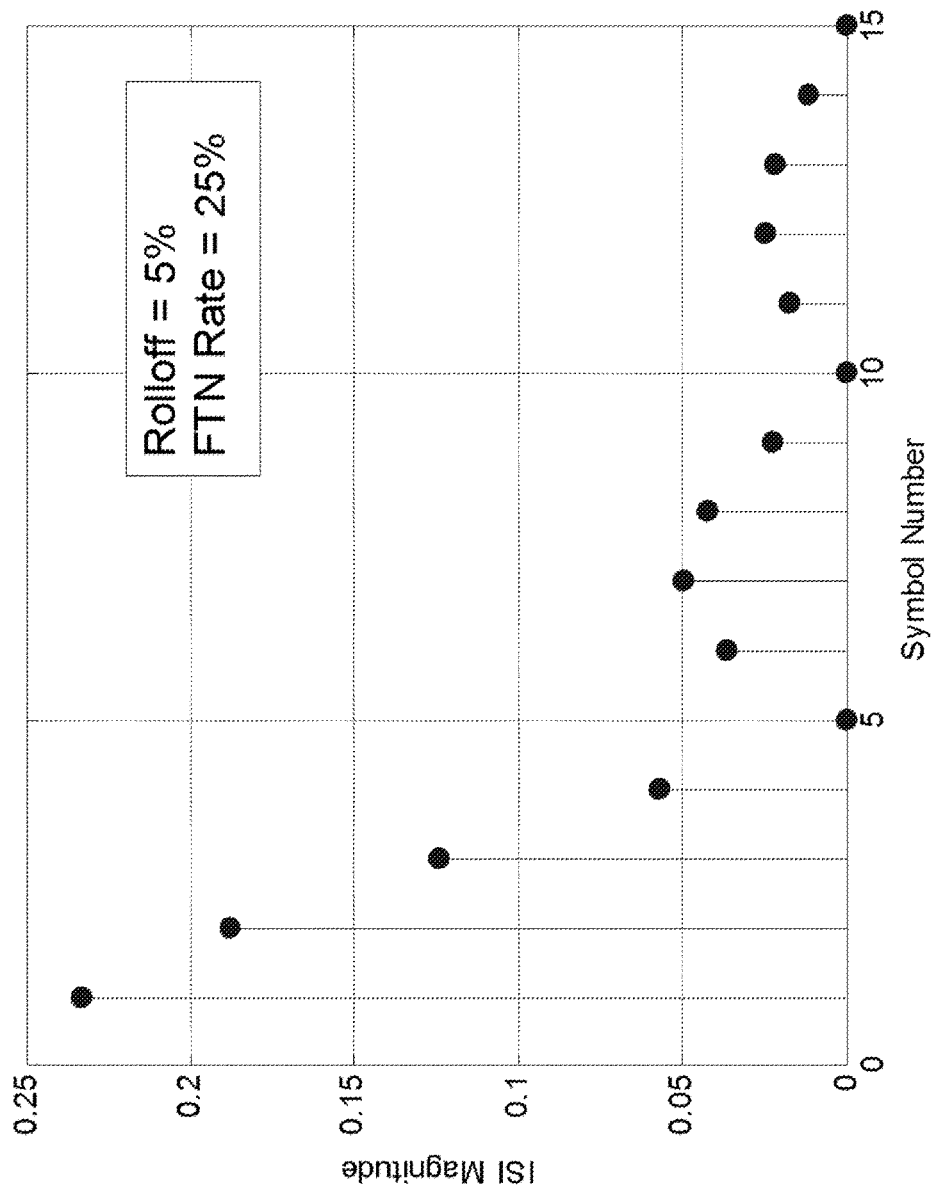
FIG. 3 illustrates the ISI introduced in the case of sharp spectral roll-off (where the roll-off is 5% and the FTN rate is 25%), in accordance with example embodiments of the present invention.

According to example embodiments of the present invention, the transmission throughput rates are configured at a faster than Nyquist (FTN) rate, wherein the FTN rate of $1/\tau$ is configured to be greater than unity. Such rates result in structured ISI that needs to be compensated for by the receiver. Further, the FTN-induced ISI has a memory span that increases with sharper spectral roll-off and more aggressive FTN rates. For example, FIG. 3 illustrates the ISI introduced in the case of sharp spectral roll-off (where the roll-off is 5% and the FTN rate is 25%), in accordance with example embodiments of the present invention. As shown in FIG. 3, the ISI introduced by time packing for spectrally efficient signals decays at a low rate, spanning as many as 15 symbols on either side. Mitigating this type of ISI using receivers of exponential complexity in terms of signal constellation size and ISI memory length would be prohibitively complex. Alternatively, such FTN and roll-off induced ISI can be efficiently compensated for using receivers of linear complexity in terms of signal constellation size and ISI memory length, in accordance with example embodiments of the present invention.

As described above, in a multi-carrier system, the satellite 132 may combine various different received carrier signals, destined for a common downlink cell, for transmission to that cell via a single downlink channel (e.g., downlink channel 227). Accordingly, within the satellite 132, a signal combiner section (not shown) combines the received continuous carrier signals 223a and 223m for transmission as composite signal 225 via the downlink channel 227. As will be understood, the composite signal 225 may further include a number of other carrier signals destined for the downlink cell serviced by the downlink channel 227. The individual signals $s_m(t)$ are then frequency-translated to their respective slot or center frequency. The composite signal can then be described in complex form as:

$$s_c(t) = \sum_{m=1}^{M_c} s_m(t) \frac{\exp(j(2\pi f_m t + \theta_m))}{\sqrt{M_c}},$$

where $f_m$ and $\theta_m$ are the center frequency and carrier phase of the mth uplink channel, respectively.

Further, within the transmit section of the satellite 132, the downlink transponder 217 amplifies the combined continuous composite signal (e.g., via an HPA) to generate the downlink transmission signal 225, which is transmitted to the respective downlink cell 230. In one embodiment, to achieve a maximum efficiency of the downlink transponder 217 (e.g., to achieve a maximum output power without overly distorting the amplified signal, and thereby achieve power and bandwidth or data throughput efficiencies), the HPA is driven near or to its saturation level, while the back-off is minimized. The HPA thereby operates in the nonlinear region of its output range, and, in view of the multiple uplink signals being transmitted simultaneously, the uplink signal carriers interact with or affect each other in a nonlinear fashion. Additionally, to achieve further efficiency, the system may be designed such that a single downlink HPA 217 may be transmitting signals of differing rates, employing multiple rate constellations (e.g., 16 APSK, 32 APSK, etc.). Accordingly, all these factors combined introduce a significant level of distortion (e.g., nonlinear interference) in the transmitted signal 225.

The receivers 203 located within the downlink cell 230, that is serviced by the downlink beam or channel 227, all receive the same transmit signal 225. Each receiver thus must first demultiplex and filter the received signal to determine or extract for further processing only the carrier of the source signal or uplink channel that is directed to the particular terminal. In a further embodiment, in the case of a multi-channel receiver, as would be recognized, the receiver may determine and process multiple carrier frequency signals of multiple uplink channels directed to the particular terminal. For simplicity, however, the following description addresses example embodiments encompassing a single-channel receiver. Accordingly, for example, the receiver 203a will first process the received transmission signal 225 to isolate the carrier phase and frequency of the uplink signal 223a. In that regard, the receiver 203a includes the receiver section 231a. In one embodiment, the receiver section may comprise a bank of receiver mixers to frequency/phase-translate each carrier of the received signal 225, where the translation may be expressed as $\sqrt{M_c} \exp(-j(2\pi f_1 t + \theta_1))$ for the signal 223a, and generally as $\sqrt{M_c} \exp(-j(2\pi f_m t + \theta_m))$ for the $m^{th}$ signal 223. The signal then passes through the receive filter bank 232a, and through the processing of the receiver section 231a and the filter bank 232a, the receiver 203a extracts the carrier signal 223a, effectively tuning to the carrier frequency and phase of the uplink signal directed to the particular receiver. In one embodiment, the input-output relationship of the receive filter bank 232 of the $m^{th}$ receiver 201 may be expressed as:

$$x_m(t) = \int_{-\infty}^{\infty} r(t)\sqrt{M_c} \exp(-j(2\pi f_m t + \theta_m))P_{m,R}(t-\tau)d\tau,$$

where $m=1, \ldots M_c$.

The filter bank 232a (e.g., $p_{m,R}(t)$) models the cascade of the matched filter and the on-board output multiplexing (OMUX) filter of the satellite transponder. The outputs of the receive filter bank are then sampled at the FTN symbol rate of the data source 205a to produce the sampled signal $x_m(n*\tau T_s)$. For example, because the extracted version of the received carrier signal 223a reflects a sequence of source symbols, each mapped to a corresponding or respective constellation point, the signal is sampled in synchronization with the sample rate of the source symbols as transmitted/received to obtain a received form or representation of each of the respective transmitted signal constellation points.

The receiver 203, via the receiver module 235, then performs mitigation to equalize the impact of FTN-induced ISI, based on an iterative process for bandwidth efficient FTN signaling. These receiver modules include an equalizer that applies Turbo processing principles. Generally, in the decoding process, Turbo processing principles employ the feedback of extrinsic information, which can be applied in many mobile communications receiver implementations. The main point of the principle employs two soft-in/soft-out detectors/decoders that receive and provide probabilities (soft values or information), where the extrinsic part of the soft output of one decoder is provided to the other decoder as a priori input. For example, where soft information is exchanged between an equalizer and decoder of the receiver module 235, as described in further detail with reference to FIG. 4.

Figure 4:
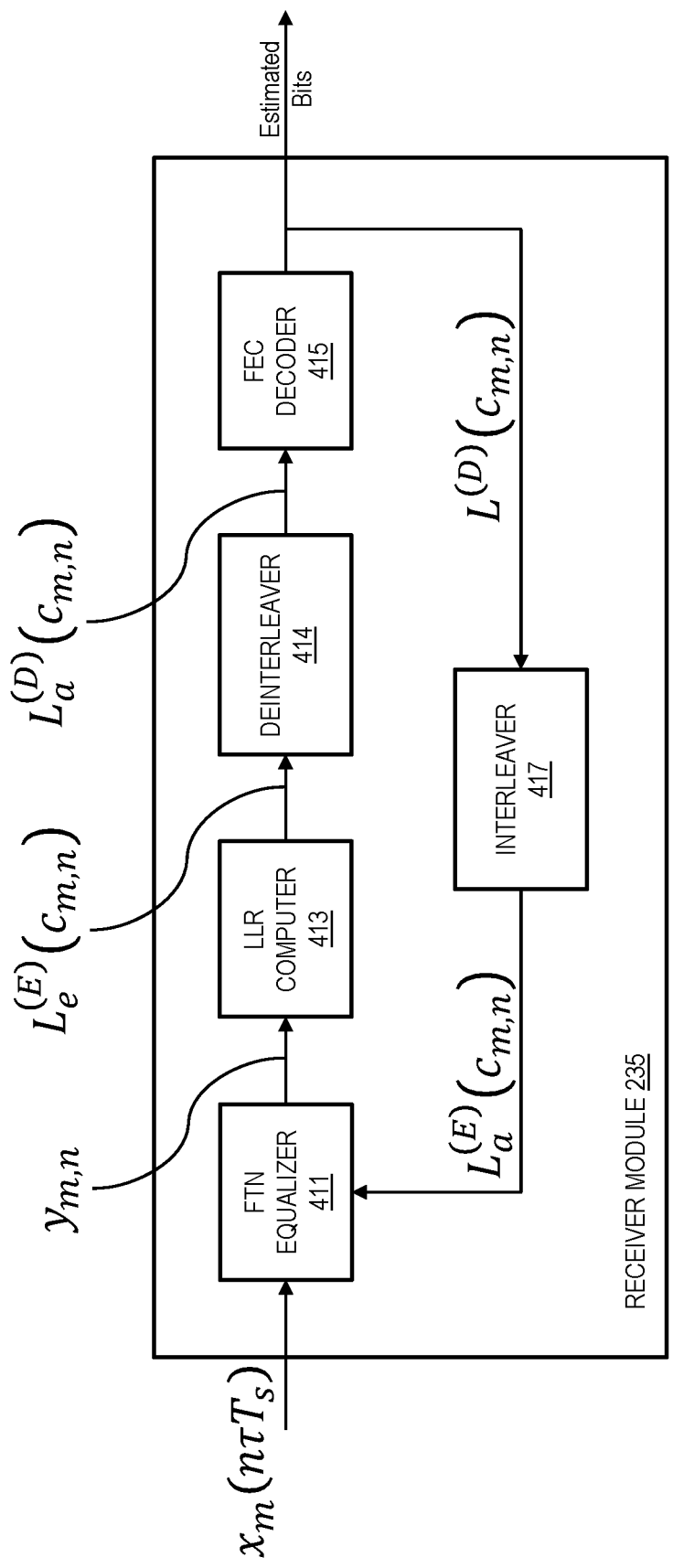
FIG. 4 illustrates a block diagram of the receiver module of FIG. 2, which is configured to compensate for FTN-induced ISI, in accordance with example embodiments of the present invention.

FIG. 4 illustrates the receiver module 235 (of FIG. 2), which includes the FTN Equalizer 411, Deinterleaver 414, FEC decoder 415 and Interleaver 417, where the FTN Equalizer 411 is configured to compensate for the FTN-induced ISI of the received symbols, in accordance with example embodiments of the present invention. By way of example, the FTN Equalizer 411 uses soft information (e.g., a priori log-likelihood ratios (LLRs), $L_a^{(E)}(c_{m,n})$) of every code bit for a given mth carrier. This a priori soft information (or a priori LLRs) used by the FTN Equalizer 411 comprises a set of a posteriori soft information (or a posteriori LLRs), $L^{(D)}(c_{m,n})$, provided by the FEC Decoder 415 (e.g., after interleaving by the Interleaver 417).

More specifically, in decoding the code bits (or received symbols) of a given $m^{th}$ carrier, for a first iteration (e.g., without any a priori information from a prior iteration), the FTN Equalizer 411 operates on the bank of receive filters $x_m(n*\tau T_s)$, and generates an output $y_{m,n}$, which is assumed to follow a Gaussian distribution. The LLR Computer 413 converts the FTN Equalizer output into the extrinsic probabilities or a posteriori LLRs, $L_e^{(E)}(c_{m,n})$, regarding the code bits. The extrinsic LLRs generated by the LLR Computer 413 are deinterleaved by the Deinterleaver 414, and provided to the FEC Decoder 415 as the LLRs $L_a^{(D)}(c_{m,n})$. The FEC Decoder 415, based on the a posteriori LLRs provided by the FTN Equalizer and LLR Computer, generates a set of a posteriori LLRs, $L^{(D)}(c_{m,n})$, which are fed back to the FTN Equalizer for the next iteration. According to one embodiment, the a posteriori LLRs, $L^{(D)}(c_{m,n})$, are fed back to the FTN Equalizer via the Interleaver 417 as the a priori LLRs, $L_a^{(E)}(c_{m,n})$, for use by the FTN Equalizer for the next iteration. For the next iteration, the FTN Equalizer 411 then uses the a priori LLRs, $L_a^{(E)}(c_{m,n})$ (from the prior iteration), and (via the LLR Computer 413) generates updated a posteriori soft information, or updated LLRs $L_a^{(E)}(c_{m,n})$, for provision (via the Deinterleaver 414) to the FEC Decoder. The FEC Decoder 415, based on the updated a posteriori LLRs provided by the FTN Equalizer and LLR Computer, in turn generates an updated set of a posteriori LLRs, $L^{(D)}(c_{m,n})$. This updated set of soft information again can then be fed back as a priori LLRs $L_a^{(E)}(c_{m,n})$ (e.g., via the Interleaver 417) for a further decoding iteration.

According to example embodiments, the computation of the extrinsic probabilities or a posteriori LLRs, $L_a^{(E)}(c_{m,n})$, pertaining to the equalizer, uses the FTN rate and roll-off values in reconstructing and accounting for the FTN-induced ISI in each carrier. In accordance with such example embodiments, accordingly, the receiver is of a complexity that grows only linearly with the interference memory. This makes it possible to compensate for ISI that spans many symbols resulting from employing sharp frequency roll-off values and aggressive FTN for efficient time and frequency packing.

The following provides a performance evaluation with respect to various example embodiments, based on an extensive Monte-Carlo simulation study. The simulation results reflect performance results based on: (1) transmitter and receiver implementations as illustrated in FIGS. 2 and 4; (2) carriers that are non-overlapping in frequency (e.g., frequency spacing is $(1+\alpha)*R_s$; (3) transmit and receive filters $P_{m,T}(t)$ and $P_{m,R}(t)$ being a matched pair of root-raised cosine (RRC) filters with a roll-off factor of 0.05; and (4) the forward error correction (FEC) being LDPC encoding and decoding with an LDPC code of codeblock length 64800 bits. Further, the performance charts reflect a DVB-S2 standard system as a benchmark for illustrating the improvement in terms of spectral efficiency measured in bits/sec/Hz, and defined as (bits/sec/Hz):

$$\eta = \frac{R_c \log_2 M}{(1+\alpha)}$$

Figure 5:
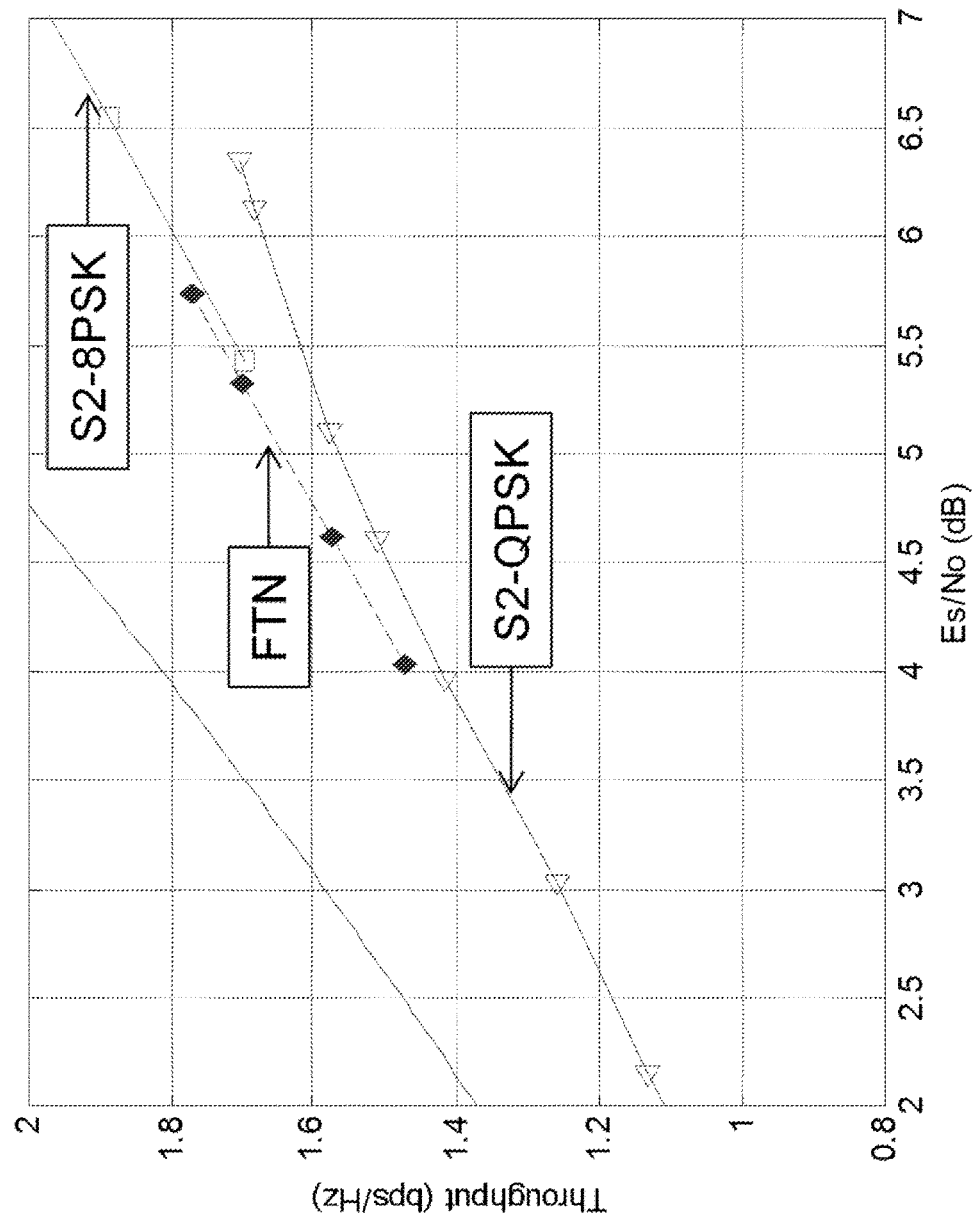
FIG. 5 shows spectral efficiency versus the symbol SNR (Es/No) required to achieve a coded packet error rate of $10^{-4}$ in an AWGN channel, for QPSK modulation with FTN rates, in accordance with example embodiments of the present invention.

FIG. 5 shows spectral efficiency versus the symbol SNR (Es/No) required to achieve a coded packet error rate of $10^{-4}$ in an AWGN channel, for QPSK modulation with FTN rates, in accordance with example embodiments of the present invention. The curve labeled S2-QPSK illustrates the performance achieved based on QPSK modulation with the DVB-S2 LDPC code at code rates 3/5, 2/3, 3/4, 4/5, 5/6, 8/9 and 9/10 (reflected by the respective triangle markers along the curve), without employing FTN rates. The maximum number of LDPC decoder iterations is set to 50. With reference to FIG. 5, obtaining a higher throughput with the DVB-S2 QPSK example would require an increase in the code rate, which in turn increases the SNR required to achieve reliable communication. For example, in order to increase the spectral efficiency from 1.42 bits/sec/Hz to 1.57 bits/sec/Hz the code rate must be increased 3/4 to 5/6, which encompasses a transition to a weaker code, resulting in a 1.1 dB penalty in SNR. Further, as evidenced by the DVB-S2 example, as you get further out on the curve, the performance tends to plateau at the higher code rates, whereby the relative throughput gains achieved diminish with transitions to higher code rates (e.g., further increases in the code rate beyond 5/6 yield marginal improvements in performance relative to the issues associated with the use of weaker FEC codes). As an alternative (based on information theory), 8PSK modulation (e.g., a larger alphabet size M) and lower DVB-S2 code rates can be employed, which achieves higher throughput at the same SNR (or the same throughout at a lower SNR). This case is illustrated in FIG. 5 by the curve marked as S2-8PSK, which shows the performance of 8PSK modulation with the DVB-S2 LDPC code at code rates 3/5 and 2/3, without employing FTN rates. In the presence of a nonlinear transponder HPA, however, 8PSK performance degrades more than QPSK, which implies that the performance gap between QPSK and 8PSK can decrease, depending upon the drive level of the HPA.

Alternatively, in accordance with example embodiments of the present invention, QPSK modulation can be employed (maintaining the alphabet size M) using FTN signaling rates to improve performance. The "FTN" curve of FIG. 5 shows the performance of QPSK modulation with FTN using the DVB-S2 LDPC code at code rates 2/3, 3/4 and 4/5. The FTN rates are specified in the following Table 1. By offering an additional degree of freedom in the time-compression τ, FTN can offer significant performance improvements over non-FTN systems through a careful optimization of the roll-off factor, τ and the code rate, for a particular M. For example, QPSK with FTN offers close to 1.25 dB improvement in performance over DVB-S2 QPSK at 1.75 bits/sec/Hz. Further, the FTN throughput curve does not plateau like the DVB-S2 QPSK curve. FTN with QPSK also outperforms DVB-S2 8PSK while potentially suffering less nonlinear distortion due to the HPA.

TABLE 1

MODCOD parameters for QPSK with FTN rates.

| Code Rate | Roll-off | FTN Rate |
|---|---|---|
| 2/3 | 5% | 17% |
| 2/3 | 5% | 25% |
| 3/4 | 5% | 20% |
| 4/5 | 5% | 17% |

Figure 6A:
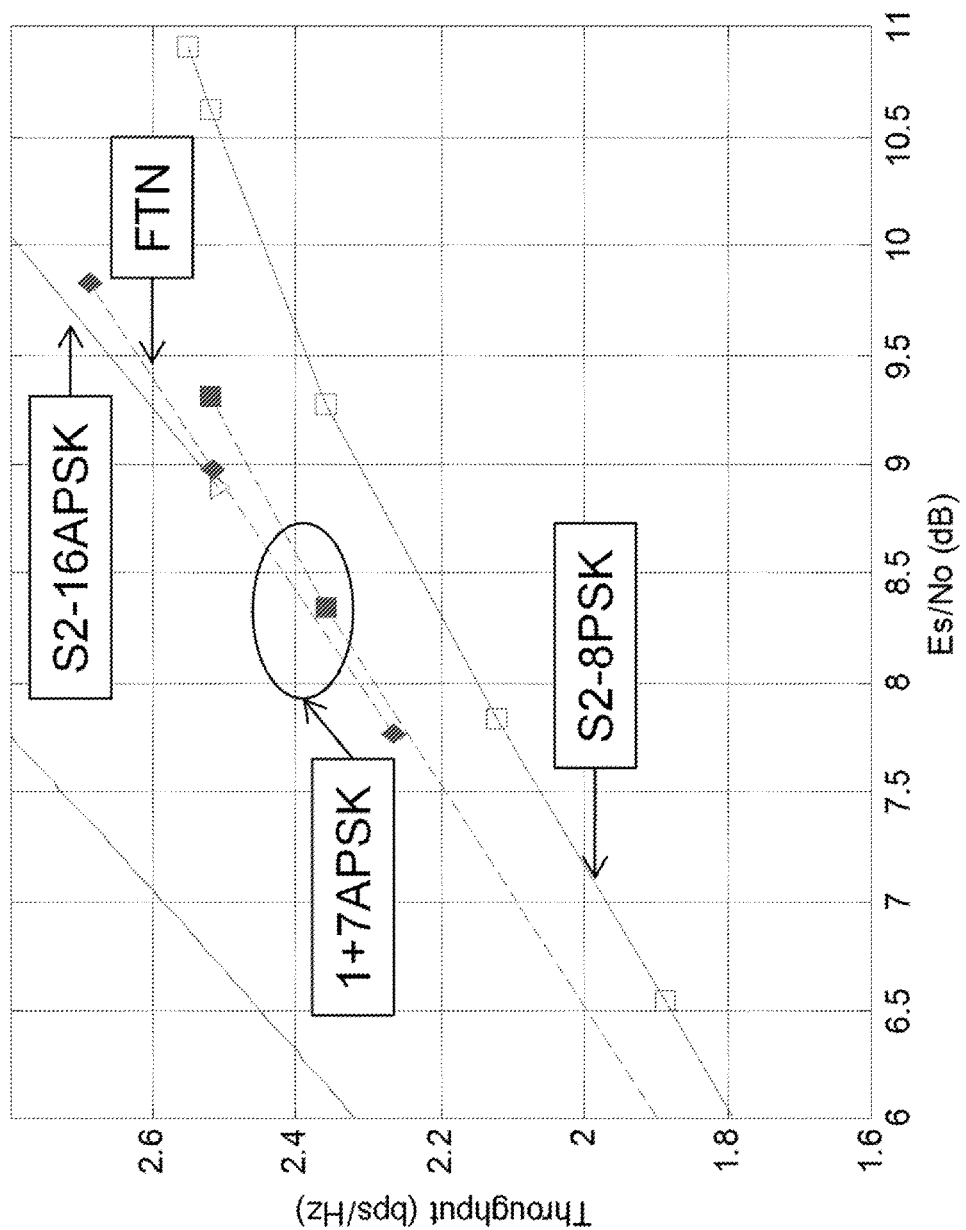
FIG. 6A shows spectral efficiency versus the symbol SNR (Es/No) required to achieve a coded packet error rate of $10^{-4}$ in an AWGN channel, for 8PSK modulation with FTN rates, in accordance with example embodiments of the present invention.
Figure 6B:
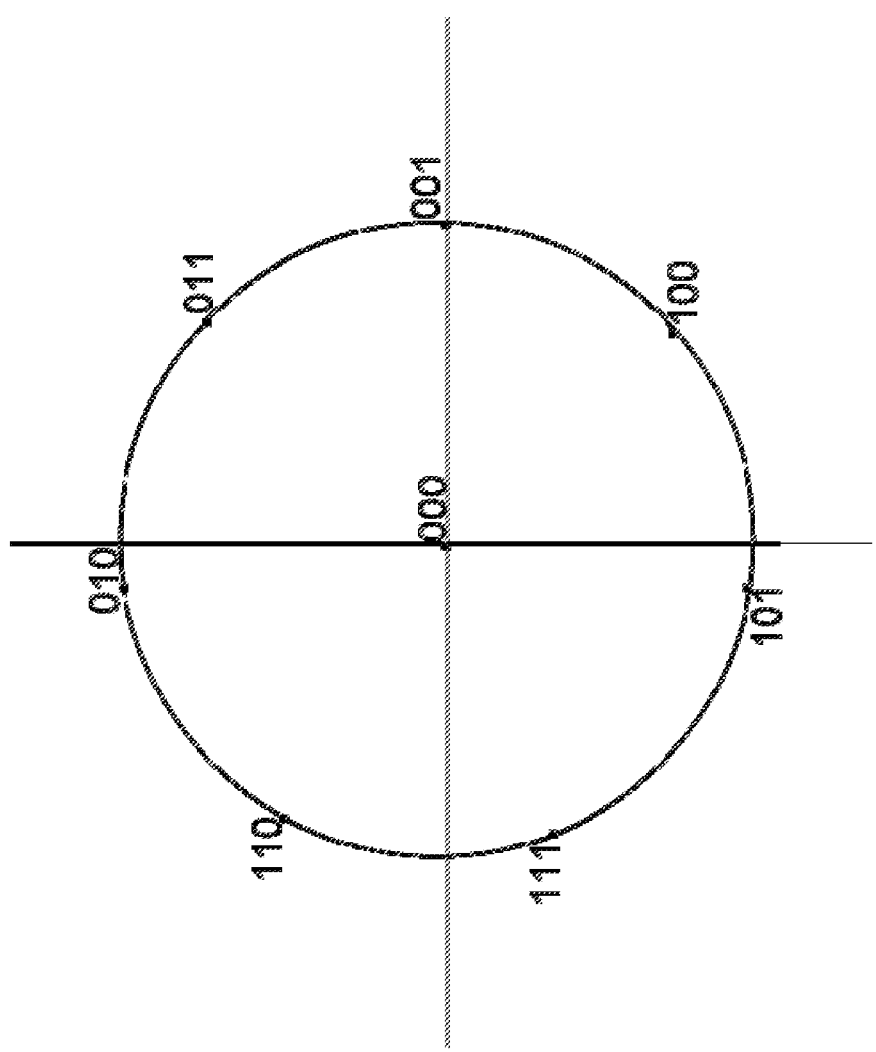
FIG. 6B shows the 1+7APSK constellation and bit-to-symbol labeling for the modulation of FIG. 6A.

FIG. 6A shows spectral efficiency versus the symbol SNR (Es/No) required to achieve a coded packet error rate of $10^{-4}$ in an AWGN channel, for 8PSK modulation with FTN rates, in accordance with example embodiments of the present invention. The curve labeled S2-8PSK illustrates the performance achieved by 8-PSK modulation with the DVB-S2 LDPC codes at code rates 2/3, 3/4, 4/5, 5/6, 8/9 and 9/10, without employing FTN rates. The maximum number of LDPC decoder iterations is set to 50. As shown in FIG. 6A, as with the DVB-S2 QPSK example, obtaining a higher throughput with 8PSK requires an increase in code rate and a resulting increase in the required SNR. The DVB-S2 8PSK throughput curve is also tends to plateau at higher bits/sec/Hz. Alternatively, the capacity limitations arising from using the DVB-S2 8PSK constellation (which puts 8 uniformly spaced constellation points on a single ring) can be overcome by using a 1+7APSK constellation and bit-to-symbol labeling shown in FIG. 6B. For the same alphabet size (M=8), as shown in the curve labeled 1+7APSK, the constellation and bit-labeling of FIG. 6B provide a significant performance improvement over the DVB-S2 8PSK modulation example. Further, the gains offered by 1+7APSK modulation can be surpassed by applying FTN to the 1+7APSK modulation, in accordance with example embodiments of the present invention. For example, 1+7APSK with FTN provides ~2 dB improvement in the performance relative to the DVB-S2 8PSK example at 2.5 bits/sec/Hz. FTN also provides a solution to the plateauing problem that 1+7APSK without FTN would experience at higher bits/sec/Hz due to diminishing coding gains. The 1+7APSK with FTN example also achieves high throughputs (>2.5 bits/s/Hz) at Es/No values that are currently impossible to match using 8-ary constellations without FTN. The FTN rates are specified in the following Table 2. FIG. 6A also indicates that 16APSK modulation (without FTN), by using lower rate DVB-S2 LDPC codes, can marginally outperform the 1+7APSK with FTN example in an AWGN channel. As with the jump from QPSK to 8PSK, 16APSK as compared to 8PSK would also be expected to degrade more in the presence of the nonlinear HPA, as it employs more energy levels. This makes the provided 1+7APSK with FTN a more pragmatic approach at those target spectral efficiencies, in a nonlinear environment.

TABLE 2

MODCOD parameters for 1 + 7APSK with FTN rates.

| Code Rate | Roll-off | FTN Rate |
|---|---|---|
| 3/4 | 5% | 6% |
| 5/6 | 5% | 6% |
| 8/9 | 5% | 6% |

Alternatively, the bit positioning for the signal constellation of FIG. 6B can be expressed as follows (where $\epsilon_x$ represents average energy per symbol):

| Bit Label | [x, y] Coordinates |
|---|---|
| 000 | [0.0, 0.0] |
| 001 | [$\sqrt{(8.0 * \epsilon_x/7.0)}$, 0.0] |
| 010 | [$\sqrt{8.0 * \epsilon_x/7.0} * \cos(4.0 * \pi/7.0), \sqrt{8.0 * \epsilon_x/7.0} * \sin(4.0 * \pi/7.0)$] |
| 011 | [$\sqrt{8.0 * \epsilon_x/7.0} * \cos(2.0 * \pi/7.0), \sqrt{8.0 * \epsilon_x/7.0} * \sin(2.0 * \pi/7.0)$] |
| 100 | [$\sqrt{8.0 * \epsilon_x/7.0} * \cos(12.0 * \pi/7.0), \sqrt{8.0 * \epsilon_x/7.0} * \sin(12.0 * \pi/7.0)$] |
| 101 | [$\sqrt{8.0 * \epsilon_x/7.0} * \cos(10.0 * \pi/7.0), \sqrt{8.0 * \epsilon_x/7.0} * \sin(10.0 * \pi/7.0)$] |
| 110 | [$\sqrt{8.0 * \epsilon_x/7.0} * \cos(6.0 * \pi/7.0), \sqrt{8.0 * \epsilon_x/7.0} * \sin(6.0 * \pi/7.0)$] |
| 111 | [$\sqrt{8.0 * \epsilon_x/7.0} * \cos(8.0 * \pi/7.0), \sqrt{8.0 * \epsilon_x/7.0} * \sin(8.0 * \pi/7.0)$] |

Moreover, while system performance is generally affected by the particular bit labeling and bit positioning for each constellation, the optimal labeling and bit positions illustrated in FIG. 6B are not unique in that certain specific modifications of bit labeling and bit positioning can achieve equivalent performance. One such modification exists with respect to the bit positions, whereby equivalent performance can be achieved with a 1+7APSK signal constellation as shown in FIG. 3A, but where each of the [x, y] bit positions is rotated by a fixed rotation factor (e.g., each bit position is rotated by the same rotation factor, such as 5 degrees, 7 degrees, 12 degrees, etc.). Other modifications exist with respect to the bit labeling, whereby equivalent performance can be achieved with a 1+7APSK signal constellation as shown in FIG. 3A, but where the bit labeling is modified by interchanging the 0's and 1's (changing each one to a zero and changing each zero to a one in each bit label) and/or by applying a uniform swapping of bit positions within each bit label (uniformly swapping one or more bit positions with one or more corresponding other bit positions in each bit label—e.g., swapping the first and third bit label positions within each bit label). Moreover, any of the foregoing specific modifications can either be applied by itself or in combination with any one or more of the other specific modifications.

Figure 7A:
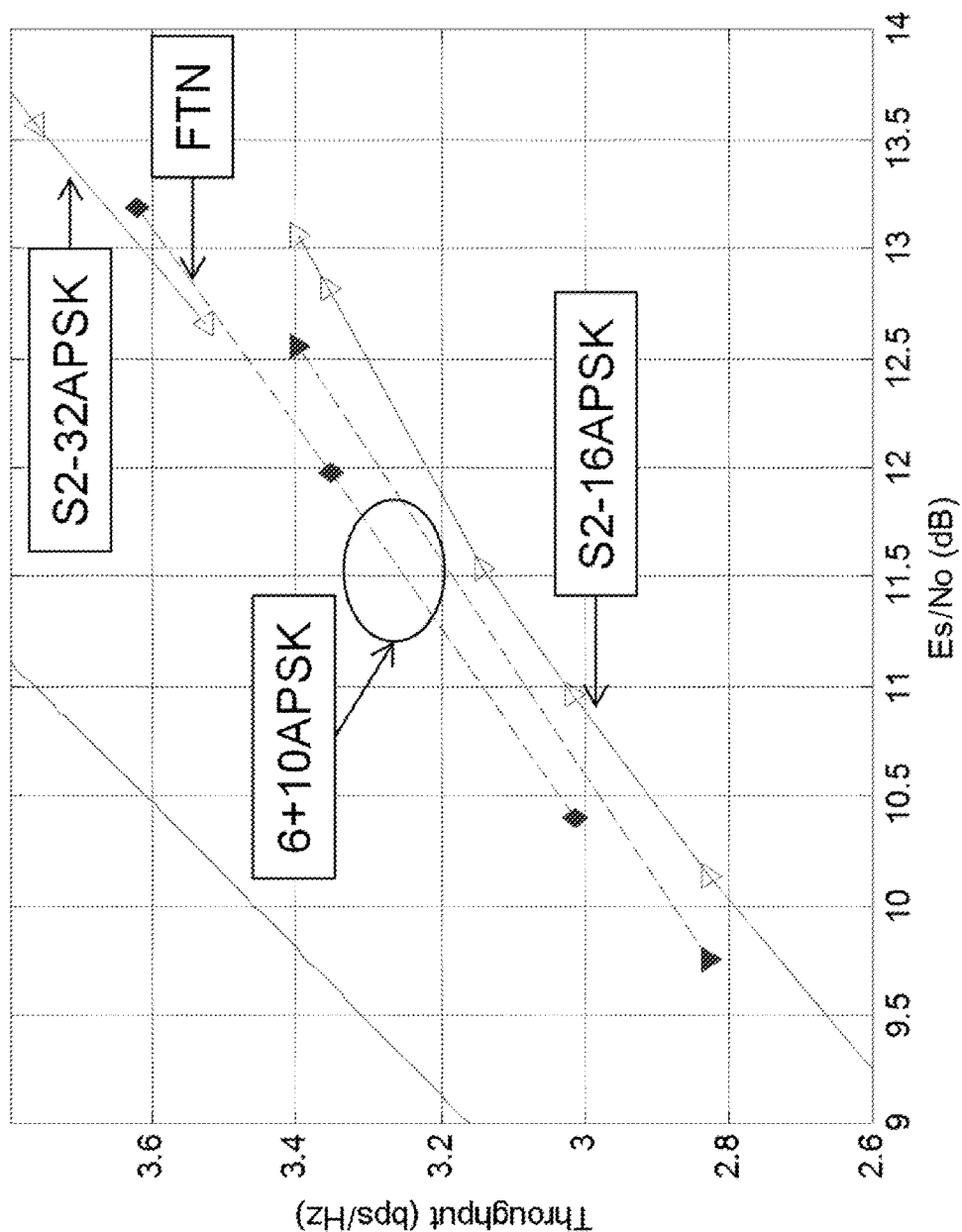
FIG. 7A shows spectral efficiency versus the symbol SNR (Es/No) required to achieve a coded packet error rate of $10^{-4}$ in an AWGN channel, for 16APSK modulation with FTN rates, in accordance with example embodiments of the present invention.
Figure 7B:
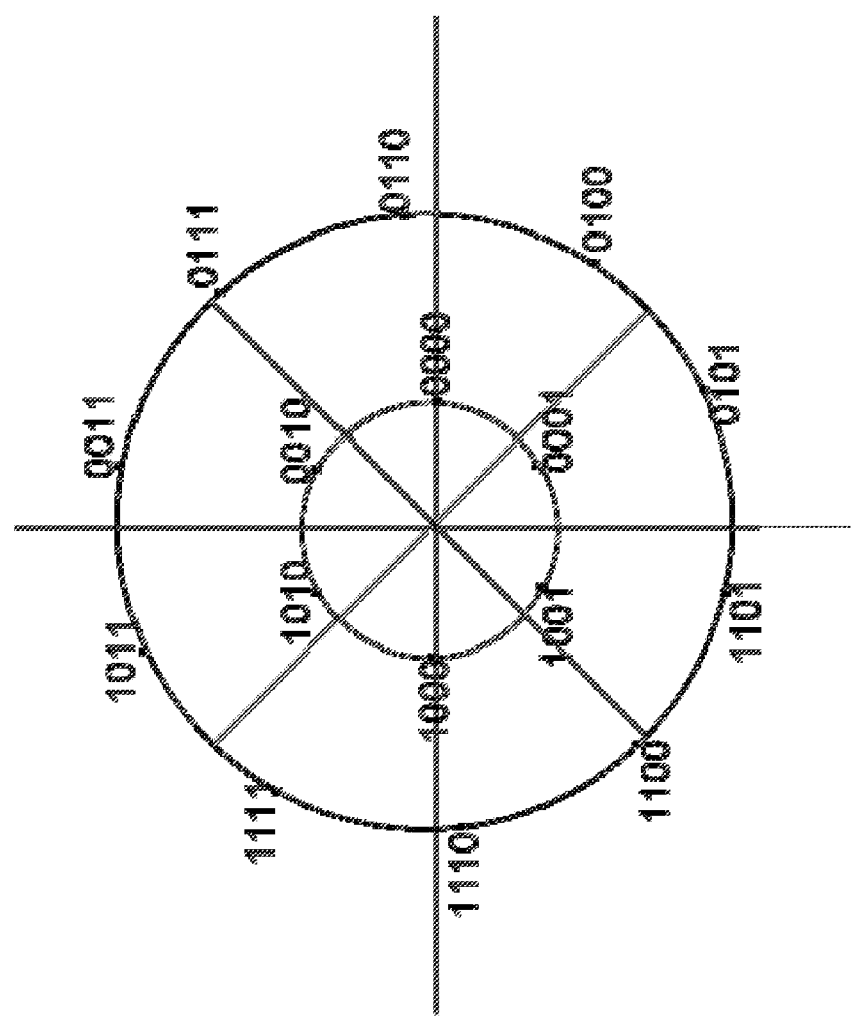
FIG. 7B shows the 6+10APSK constellation and bit-to-symbol labeling for the modulation of FIG. 7A.

FIG. 7A shows spectral efficiency versus the symbol SNR (Es/No) required to achieve a coded packet error rate of $10^{-4}$ in an AWGN channel, for 16APSK modulation with FTN rates, in accordance with example embodiments of the present invention. The curve labeled S2-16PSK illustrates the performance achieved by the DVB-S2 4+12APSK modulation with the DVB-S2 LDPC codes at code rates 3/4, 4/5, 5/6, 8/9 and 9/10, without employing FTN rates. The maximum number of LDPC decoder iterations is set to 50. Alternatively, the capacity limitations arising from using the 4+12 DVB-S2 16APSK constellation can be overcome by using a 6+10APSK constellation and bit-to-symbol labeling as shown in FIG. 7B. For the same alphabet size (M=16), as shown in the curve labeled 6+10APSK, the constellation and bit-labeling of FIG. 7B provide a significant performance improvement over the DVB-S2 16APSK modulation example. The 6+10APSK constellation provides close to 0.5 dB improvement over the DVB-S2 16APSK example. Further, in accordance with example embodiments of the present invention, the employment of FTN rates with the 6+10APSK constellation offers further performance improvements, as illustrated by the curve labeled "FTN." Moreover, as further illustrated by FIG. 7A, with the employment of FTN rates, 6+10APSK can attain throughputs at Es/No values that are not presently known to be achievable with a 16-ary constellation without FTN rates. The FTN rates are specified in the following Table 3. FIG. 7A also indicates that 32APSK modulation using lower rate DVB-S2 LDPC codes, without FTN rates, can marginally outperform 6+10APSK with FTN in an AWGN channel. Again, however, 32APSK would also be expected to degrade more in the presence of the nonlinear HPA. The provided 6+10APSK with FTN approach thus represents a more pragmatic approach at target spectral efficiencies in a nonlinear environment.

TABLE 3

MODCOD parameters for 6 + 10APSK with FTN rates.

| Code Rate | Roll-off | FTN Rate |
|---|---|---|
| 3/4 | 5% | 6% |
| 5/6 | 5% | 6% |
| 9/10 | 5% | 6% |

Alternatively, the bit positioning for the signal constellation of FIG. 7B can be expressed as follows (where $\epsilon_x$ represents average energy per symbol, $6*R1^2+10*R2^2=16$, and R1 represents the radius of the inner ring and R2 represents the radius of the outer ring):

| Bit Label | [x, y] Coordinates |
|---|---|
| 0000 | [R1* $\sqrt{\epsilon_x}$, 0.0] |
| 0001 | [R1 * $\sqrt{\epsilon_x}$ * cos(5.0 * π/3.0), R1 * $\sqrt{\epsilon_x}$ * sin(5.0 * π/3.0)] |
| 0010 | [R1 * $\sqrt{\epsilon_x}$ * cos(π/3.0), R1 * $\sqrt{\epsilon_x}$ * sin(π/3.0)] |
| 0011 | [R2 * $\sqrt{\epsilon_x}$ * cos(13.0 * π/30.0), R2 * $\sqrt{\epsilon_x}$ * sin(13.0 * π/30.0)] |
| 0100 | [R2 * $\sqrt{\epsilon_x}$ * cos(55.0 * π/30.0), R2 * $\sqrt{\epsilon_x}$ * sin(55.0 * π/30.0)] |
| 0101 | [R2 * $\sqrt{\epsilon_x}$ * cos(49.0 * π/30.0), R2 * $\sqrt{\epsilon_x}$ * sin(49.0 * π/30.0)] |
| 0110 | [R2 * $\sqrt{\epsilon_x}$ * cos(π/30.0), R2 * $\sqrt{\epsilon_x}$ * sin(π/30.0)] |
| 0111 | [R2 * $\sqrt{\epsilon_x}$ * cos(7.0 * π/30.0), R2 * $\sqrt{\epsilon_x}$ * sin(7.0 * π/30.0)] |
| 1000 | [−R1* $\sqrt{\epsilon_x}$, 0.0] |
| 1001 | [R1 * $\sqrt{\epsilon_x}$ * cos(4.0 * π/3.0), R1 * $\sqrt{\epsilon_x}$ * sin(4.0 * π/3.0)] |
| 1010 | [R1 * $\sqrt{\epsilon_x}$ * cos(2.0 * π/3.0), R1 * $\sqrt{\epsilon_x}$ * sin(2.0 * π/3.0)] |
| 1011 | [R2 * $\sqrt{\epsilon_x}$ * cos(19.0 * π/30.0), R2 * $\sqrt{\epsilon_x}$ * sin(19.0 * π/30.0)] |
| 1100 | [R2 * $\sqrt{\epsilon_x}$ * cos(37.0 * π/30.0), R2 * $\sqrt{\epsilon_x}$ * sin(37.0 * π/30.0)] |
| 1101 | [R2 * $\sqrt{\epsilon_x}$ * cos(43.0 * π/30.0), R2 * $\sqrt{\epsilon_x}$ * sin(43.0 * π/30.0)] |
| 1110 | [R2 * $\sqrt{\epsilon_x}$ * cos(31.0 * π/30.0), R2 * $\sqrt{\epsilon_x}$ * sin(31.0 * π/30.0)] |
| 1111 | [R2 * $\sqrt{\epsilon_x}$ * cos(25.0 * π/30.0), R2 * $\sqrt{\epsilon_x}$ * sin(25.0 * π/30.0)] |

Moreover, also as described above with respect to the 1+7APSK constellation, the optimal labeling and bit positions illustrated in FIG. 7B are not unique in that the above-specified modifications of the bit labeling and bit positioning can achieve equivalent performance. With respect to the bit positions, equivalent performance can be achieved with a 6+10APSK signal constellation as shown in FIG. 7B, but where each of the [x, y] bit positions is rotated by a fixed rotation factor (e.g., each bit position is rotated by the same rotation factor). Also, with respect to the bit labeling, equivalent performance can be achieved with a 6+10APSK signal constellation as shown in FIG. 7B, but where the bit labeling is modified by interchanging the 0's and 1's, and/or by applying a uniform swapping of bit positions within each bit label (e.g., swapping the first and third bit label positions within each bit label). Moreover, any of the foregoing specific modifications can either be applied by itself or in combination with any one or more of the other specific modifications.

Figure 8A:
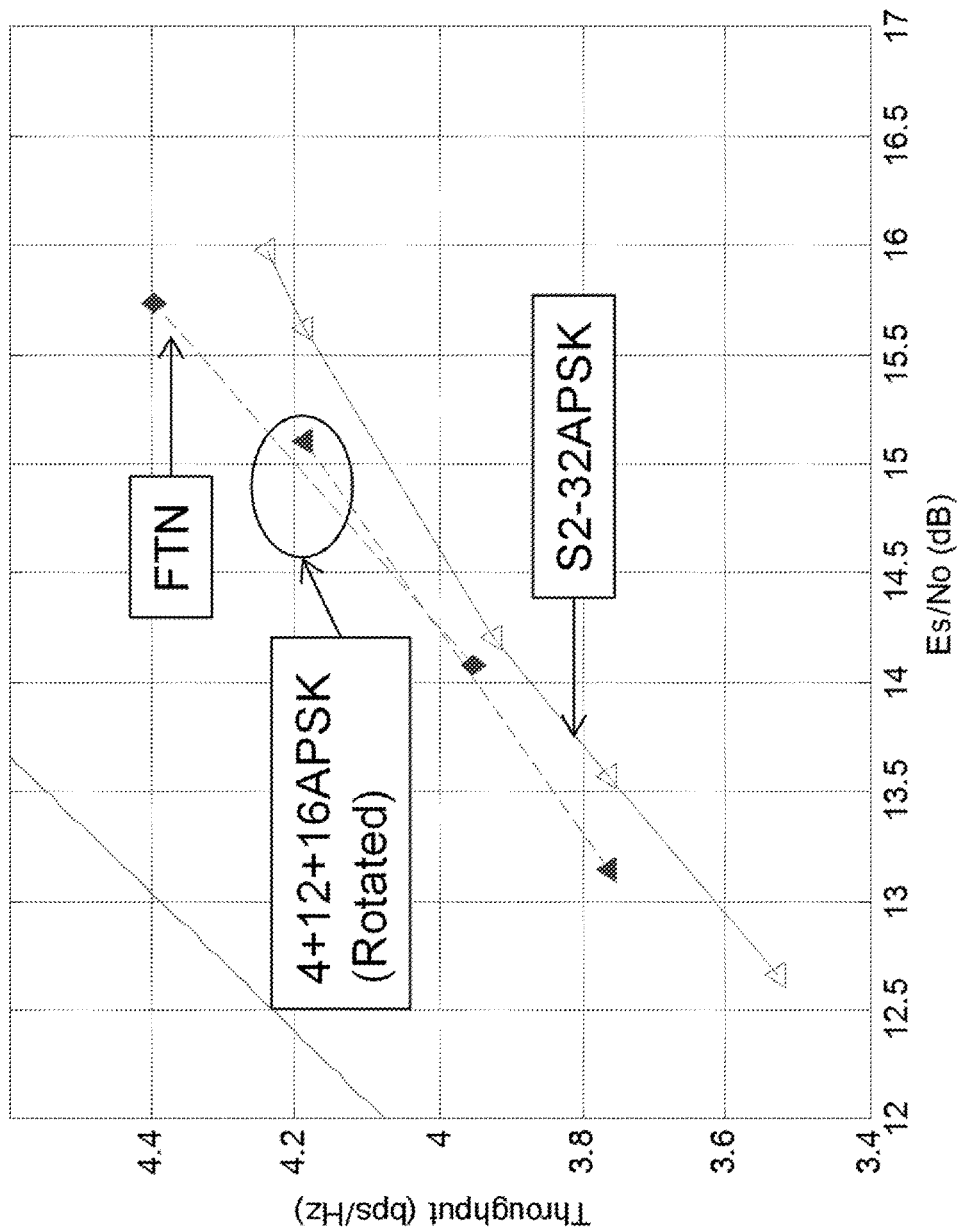
FIG. 8A shows spectral efficiency versus the symbol SNR (Es/No) required to achieve a coded packet error rate of $10^{-4}$ in an AWGN channel, for 32APSK modulation with FTN rates, in accordance with example embodiments of the present invention.
Figure 8B:
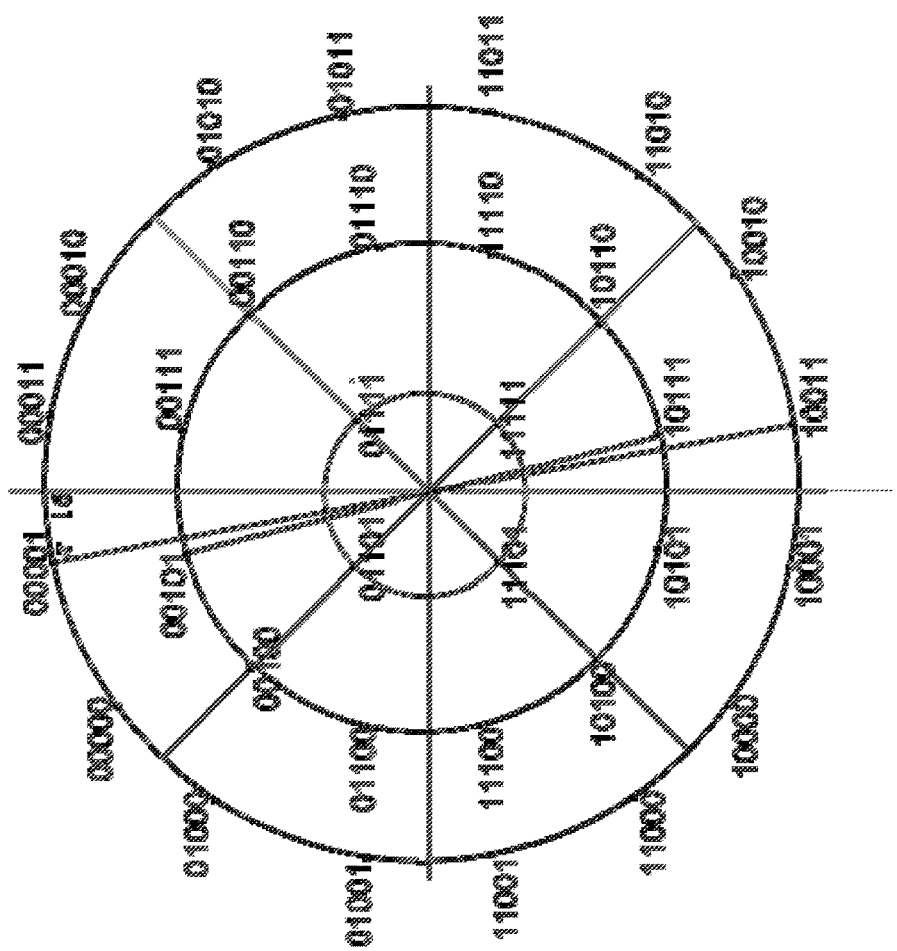
FIG. 8B shows the 4+12+16APSK-rotated constellation and bit-to-symbol labeling for the modulation of FIG. 8A.

FIG. 8A shows spectral efficiency versus the symbol SNR (Es/No) required to achieve a coded packet error rate of $10^{-4}$ in an AWGN channel, for 32APSK modulation with FTN rates, in accordance with example embodiments of the present invention. The curve labeled S2-32APSK illustrates the performance that can be achieved by the 4+12+16APSK modulation as specified in the DVB-S2 standard with the DVB-S2 LDPC codes at code rates 3/4, 4/5, 5/6, 8/9 and 9/10, without employing FTN rates. The maximum number of LDPC decoder iterations is set to 50. Alternatively, the capacity limitations arising from using the 4+12+16 DVB-S2 32APSK constellation can be overcome by using a 4+12+16APSK-rotated constellation and bit-to-symbol labeling shown in as shown in FIG. 8B. For the same alphabet size (M=32), as shown in the curve labeled 4+12+16APSK (Rotated), the constellation and bit-labeling of FIG. 8B provide a significant performance improvement over the DVB-S2 32APSK modulation example. The 4+12+16APSK-rotated constellation of FIG. 8B provides close to 0.5-0.7 dB improvement over the DVB-S2 4+12+16APSK example. Further, the combination of FTN rates with the 4+12+16APSK-rotated constellation achieves even further improvements, as illustrated in FIG. 8A by the curve labeled "FTN." The FTN rates are specified in the following Table 4.

TABLE 4

MODCOD parameters for 4 + 12 + 16APSK-rotated with FTN rates.

| Code Rate | Roll-off | FTN Rate |
|---|---|---|
| 4/5 | 5% | 6% |
| 8/9 | 5% | 6% |

Alternatively, the bit positioning for the signal constellation of FIG. 8B can be expressed as follows (where $\epsilon_x$ represents average energy per symbol, $4*R1^2+12*R2^2+16*R3^2=32$, and R1 represents the radius of the inner-most ring, R2 represents the radius of the middle ring and R3 represents the radius of the outer ring):

| Bit Label | [x, y] Coordinates |
|---|---|
| 00000 | [−R3 * $\sqrt{\epsilon_x}$ * cos(5.0 * π/16.0), R3 * $\sqrt{\epsilon_x}$ * cos(3.0 * π/16.0)] |
| 00001 | [−R3 * $\sqrt{\epsilon_x}$ * cos(7.0 * π/16.0), R3 * $\sqrt{\epsilon_x}$ * cos(π/16.0)] |
| 00010 | [R3 * $\sqrt{\epsilon_x}$ * cos(5.0 * π/16.0), R3 * $\sqrt{\epsilon_x}$ * cos(3.0 * π/16.0)] |
| 00011 | [R3 * $\sqrt{\epsilon_x}$ * cos(7.0 * π/16.0), R3 * $\sqrt{\epsilon_x}$ * cos(π/16.0)] |
| 00100 | [−R2 * $\sqrt{\epsilon_x}$ * sin(π/4.0), R2 * $\sqrt{\epsilon_x}$ * sin(π/4.0)] |
| 00101 | [−R2 * $\sqrt{\epsilon_x}$ * sin(π/12.0), R2 * $\sqrt{\epsilon_x}$ * sin(5.0 * π/12.0)] |

-continued

| Bit Label | [x, y] Coordinates |
|---|---|
| 00110 | [R2 * $\sqrt{\epsilon_x}$ * sin(π/4.0), R2 * $\sqrt{\epsilon_x}$ * sin(π/4.0)] |
| 00111 | [R2 * $\sqrt{\epsilon_x}$ * sin(π/12.0), R2 * $\sqrt{\epsilon_x}$ * sin(5.0 * π/12.0)] |
| 01000 | [−R3 * $\sqrt{\epsilon_x}$ * cos(3.0 * π/16.0), R3 * $\sqrt{\epsilon_x}$ * cos(5.0 * π/16.0)] |
| 01001 | [−R3 * $\sqrt{\epsilon_x}$ * cos(π/16.0), R3 * $\sqrt{\epsilon_x}$ * cos(7.0 * π/16.0)] |
| 01010 | [R3 * $\sqrt{\epsilon_x}$ * cos(3.0 * π/16.0), R3 * $\sqrt{\epsilon_x}$ * cos(5.0 * π/16.0)] |
| 01011 | [R3 * $\sqrt{\epsilon_x}$ * cos(π/16.0), R3 * $\sqrt{\epsilon_x}$ * cos(7.0 * π/16.0)] |
| 01100 | [−R2 * $\sqrt{\epsilon_x}$ * sin(5.0 * π/12.0), R2 * $\sqrt{\epsilon_x}$ * sin(π/12.0)] |
| 01101 | [−R1 * $\sqrt{\epsilon_x}$ * sin(π/4.0), R1 * $\sqrt{\epsilon_x}$ * sin(π/4.0)] |
| 01110 | [R2 * $\sqrt{\epsilon_x}$ * sin(5.0 * π/12.0), R2 * $\sqrt{\epsilon_x}$ * sin(π/12.0)] |
| 01111 | [R1 * $\sqrt{\epsilon_x}$ * sin(π/4.0), R1 * $\sqrt{\epsilon_x}$ * sin(π/4.0)] |
| 10000 | [−R3 * $\sqrt{\epsilon_x}$ * cos(5.0 * π/16.0), −R3 * $\sqrt{\epsilon_x}$ * cos(3.0 * π/16.0)] |
| 10001 | [−R3 * $\sqrt{\epsilon_x}$ * cos(7.0 * π/16.0), −R3 * $\sqrt{\epsilon_x}$ * cos(π/16.0)] |
| 10010 | [R3 * $\sqrt{\epsilon_x}$ * cos(5.0 * π/16.0), −R3 * $\sqrt{\epsilon_x}$ * cos(3.0 * π/16.0)] |
| 10011 | [R3 * $\sqrt{\epsilon_x}$ * cos(7.0 * π/16.0), −R3 * $\sqrt{\epsilon_x}$ * cos(π/16.0)] |
| 10100 | [−R2 * $\sqrt{\epsilon_x}$ * sin(π/4.0), −R2 * $\sqrt{\epsilon_x}$ * sin(π/4.0)] |
| 10101 | [−R2 * $\sqrt{\epsilon_x}$ * sin(π/12.0), −R2 * $\sqrt{\epsilon_x}$ * sin(5.0 * π/12.0)] |
| 10110 | [R2 * $\sqrt{\epsilon_x}$ * sin(π/4.0), −R2 * $\sqrt{\epsilon_x}$ * sin(π/4.0)] |
| 10111 | [R2 * $\sqrt{\epsilon_x}$ * sin(π/12.0), −R2 * $\sqrt{\epsilon_x}$ * sin(5.0 * π/12.0)] |
| 11000 | [−R3 * $\sqrt{\epsilon_x}$ * cos(3.0 * π/16.0), −R3 * $\sqrt{\epsilon_x}$ * cos(5.0 * π/16.0)] |
| 11001 | [−R3 * $\sqrt{\epsilon_x}$ * cos(π/16.0), −R3 * $\sqrt{\epsilon_x}$ * cos(7.0 * π/16.0)] |
| 11010 | [R3 * $\sqrt{\epsilon_x}$ * cos(3.0 * π/16.0), −R3 * $\sqrt{\epsilon_x}$ * cos(5.0 * π/16.0)] |
| 11011 | [R3 * $\sqrt{\epsilon_x}$ * cos(π/16.0), −R3 * $\sqrt{\epsilon_x}$ * cos(7.0 * π/16.0)] |
| 11100 | [−R2 * $\sqrt{\epsilon_x}$ * sin(5.0 * π/12.0), −R2 * $\sqrt{\epsilon_x}$ * sin(π/12.0)] |
| 11101 | [−R1 * $\sqrt{\epsilon_x}$ * sin(π/4.0), −R1 * $\sqrt{\epsilon_x}$ * sin(π/4.0)] |
| 11110 | [R2 * $\sqrt{\epsilon_x}$ * sin(5.0 * π/12.0), −R2 * $\sqrt{\epsilon_x}$ * sin(π/12.0)] |
| 11111 | [R1 * $\sqrt{\epsilon_x}$ * sin(π/4.0), −R1 * $\sqrt{\epsilon_x}$ * sin(π/4.0)] |

Moreover, again, the optimal labeling and bit positions illustrated in FIG. 8B are not unique in that the above-specified modifications of the bit labeling and bit positioning can achieve equivalent performance. With respect to the bit positions, equivalent performance can be achieved with 4+12+16APSK signal constellations as shown in FIG. 8B, but where each of the [x, y] bit positions is rotated by a fixed rotation factor (e.g., each bit position is rotated by the same rotation factor). Also, with respect to the bit labeling, equivalent performance can be achieved with 4+12+16APSK signal constellations as shown in FIG. 8B, but where the bit labeling is modified by interchanging the 0's and 1's, and/or by applying a uniform swapping of bit positions within each bit label (e.g., swapping the first and third bit label positions within each bit label). Moreover, any of the foregoing specific modifications can either be applied by itself or in combination with any one or more of the other specific modifications.

Figure 9:
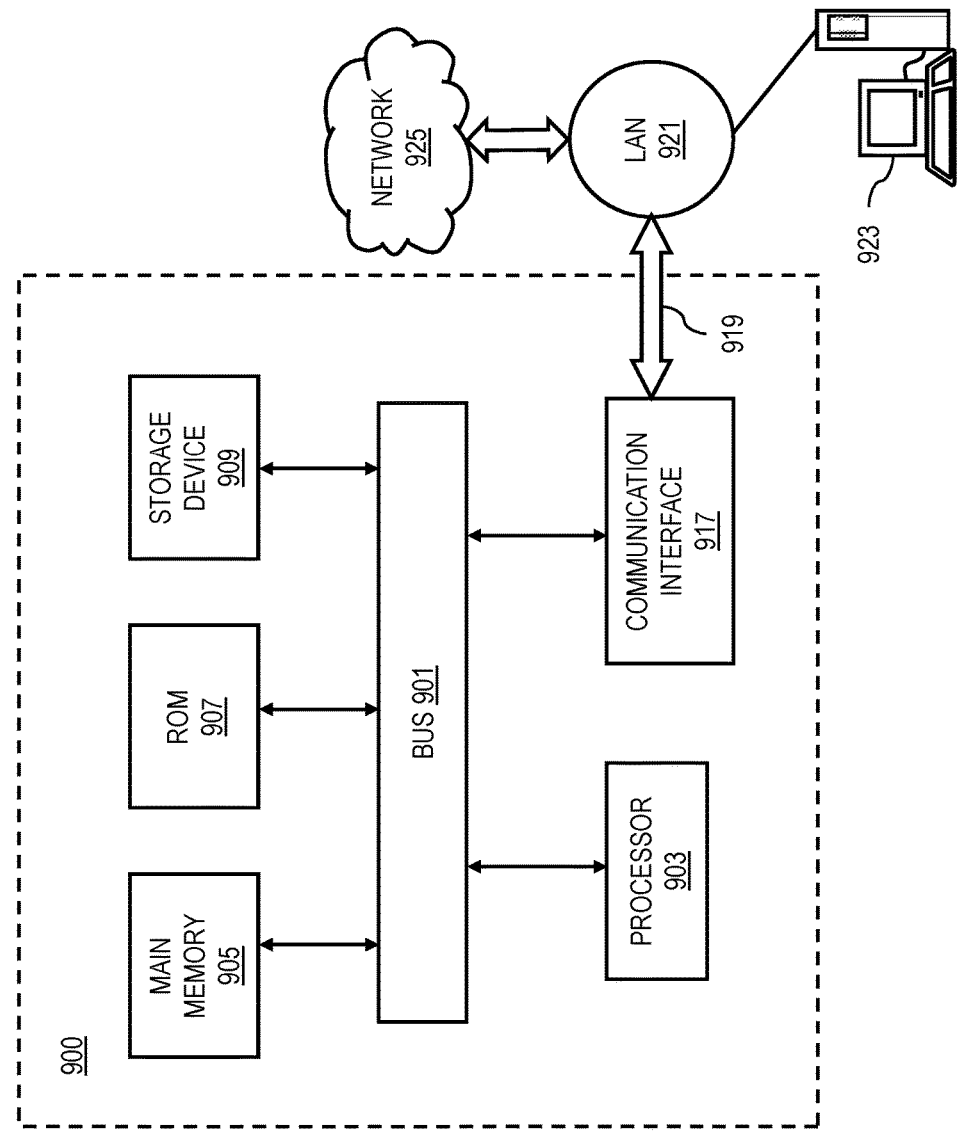
FIG. 9 illustrates a computer system upon which example embodiments according to the present invention can be implemented.

FIG. 9 illustrates a computer system upon which example embodiments according to the present invention can be implemented. The computer system 900 includes a bus 901 or other communication mechanism for communicating information, and a processor 903 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions to be executed by the processor 903. The computer system 900 further includes a read only memory (ROM) 907 or other static storage device coupled to the bus 901 for storing static information and instructions for the processor 903. A storage device 909, such as a magnetic disk or optical disk, is additionally coupled to the bus 901 for storing information and instructions.

According to one embodiment of the invention, implementations of an interference compensation system and algorithms, in accordance with example embodiments, are provided by the computer system 900 in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry is used in place of or in combination with software instructions to implement the embodiment of the present invention. Thus, embodiments of the present invention are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, or a telephone modem to provide a data communication connection to a corresponding type of telephone line. As another example, communication interface 917 may be a local area network (LAN) card (e.g., for Ethernet™ or an Asynchronous Transfer Mode (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917, for example, includes peripheral interface devices, such as a Universal Serial Bus (USB) interface, a PCMCIA (Personal Computer Memory Card International Association) interface, etc.

The network link 919 typically provides data communication through one or more networks to other data devices. For example, the network link 919 provides a connection through local network 921 to a host computer 923, which has connectivity to a network 925 (e.g., a wide area network (WAN) or the global packet data communication network now commonly referred to as the "Internet") or to data equipment operated by service provider. The local network 921 and network 925 both use electrical, electromagnetic, or optical signals to convey information and instructions. The signals through the various networks and the signals on network link 919 and through communication interface 917, which communicate digital data with computer system 900, are example forms of carrier waves bearing the information and instructions.

The computer system 900 sends messages and receives data, including program code, through the network(s), network link 919, and communication interface 917. In the Internet example, a server (not shown) might transmit requested code belonging to an application program for implementing an embodiment of the present invention through the network 925, local network 921 and communication interface 917. The processor 903 executes the transmitted code while being received and/or store the code in storage device 239, or other non-volatile storage for later execution. In this manner, computer system 900 obtains application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as storage device 909. Volatile media may include dynamic memory, such as main memory 905. Transmission media may include coaxial cables, copper wire and fiber optics, including the wires that comprise bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Figure 10:
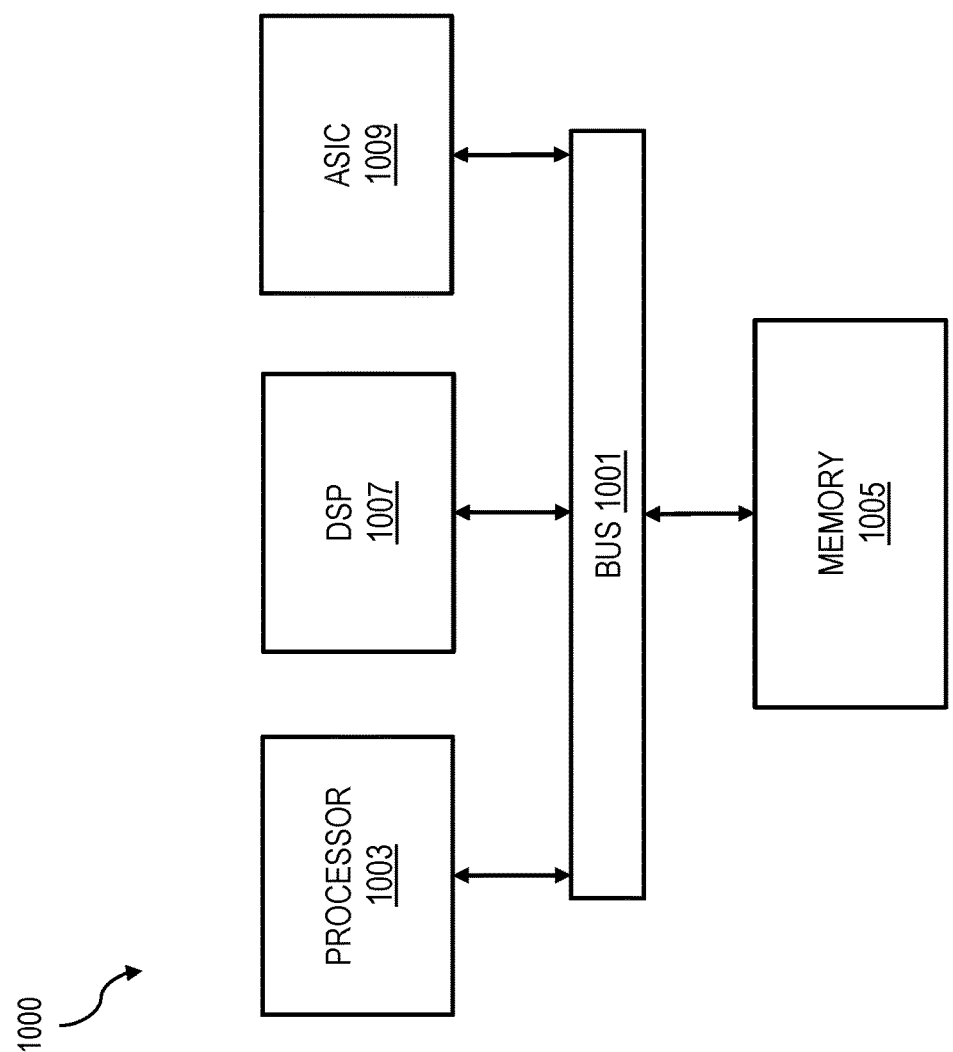
FIG. 10 is a diagram of a chip set that can be utilized in implementing an interference compensation system, according to example embodiments.

FIG. 10 illustrates a chip set 1000 in which embodiments of the invention may be implemented. Chip set 1000 includes, for instance, processor and memory components described with respect to FIG. 9 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 includes one or more processing cores with each core configured to perform independently. A multi-core processor enables multiprocessing within a single physical package. Examples of a multi-core processor include two, four, eight, or greater numbers of processing cores. Alternatively or in addition, the processor 1003 includes one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, and/or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM) and static memory (e.g., ROM) for storing executable instructions that, when executed by the processor 1003 and/or the DSP 1007 and/or the ASIC 1009, perform the process of example embodiments as described herein. The memory 1005 also stores the data associated with or generated by the execution of the process.

As will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various exemplary embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. An apparatus comprising:
   a receiver configured to receive a signal transmitted over a wireless channel via a high-power amplifier of a transponder,
      wherein the received signal comprises a discrete carrier signal of a respective carrier phase and frequency, and wherein the carrier signal reflects a plurality of source data symbols of a respective source signal with which it was modulated, and wherein the carrier signal includes inter-symbol interference (ISI) effects induced based on a faster-than-Nyquist (FTN) signaling rate and a tight frequency roll-off applied to the respective source signal for transmission over the wireless channel;

a sampler circuit configured to sample the carrier signal at the FTN signaling rate to generate a sequence of sampled estimates of the source data symbols of the respective source signal; and a receive signal processor configured to process the sequence of sampled source data symbol estimates to determine original source data symbols of the respective source signal;

wherein the receive signal processor comprises:
an equalizer configured to compensate for the ISI effects induced based on the FTN signaling rate and the tight frequency roll-off applied to the source signal; and
a decoder configured to decode an output of the equalizer to determine and regenerate the respective source signal for the carrier signal.

2. The apparatus according to claim 1, wherein the FTN signaling rate is approximately 6% and the tight frequency roll-off is approximately 5%.

3. The apparatus according to claim 1, wherein, in compensating for the ISI effects induced by the FTN signaling rate and tight frequency roll-off, the equalizer is configured to use a priori soft information of every code bit for the carrier on which the source signal was transmitted.

4. The apparatus according to claim 3, wherein the a priori soft information comprises log-likelihood ratios (LLRs).

5. The apparatus according to claim 3, wherein:
the decoder is further configured to generate a set of a posteriori log-likelihood ratios (LLRs) based on the output of the equalizer; and
the a priori soft information used by the equalizer comprises the a posteriori LLRs generated by the decoder.

6. The apparatus according to claim 3, wherein, in compensating for the ISI effects induced by the FTN signaling rate and tight frequency roll-off, the receive signal processor is configured to process the received signal via a plurality of processing iterations, and wherein:
for a one processing iteration, the decoder is further configured to generate a set of a posteriori soft information based on the output of the equalizer; and
for a processing iteration subsequent to the one processing iteration, the a priori soft information used by the equalizer comprises the a posteriori soft information generated by the decoder for the one processing iteration.

7. The apparatus according to claim 3, wherein, in compensating for the ISI effects induced by the FTN signaling rate and tight frequency roll-off, the receive signal processor is configured to process the received signal via a plurality of processing iterations, and wherein the receive signal processor further comprises:
a log-likelihood ratio (LLR) processor configured to generate, for a one processing iteration, a set of a posteriori log-likelihood ratios (LLRs) based on the output of the equalizer; and
wherein the decoder is further configured to decode, for the one processing iteration, the a posteriori LLRs generated by the LLR processor, and to provide the decoded a posteriori LLRs back to the equalizer; and wherein the a priori soft information used by the equalizer, for a processing iteration subsequent to the one processing iteration, comprises the decoded a posteriori LLRs provided by the decoder from the one processing iteration.

8. The apparatus according to claim 7, further comprising:
a deinterleaver configured to deinterleave the a posteriori LLRs generated by the LLR processor before being decoded by the decoder; and
an interleaver configured to interleave the decoded a posteriori LLRs generated by the decoder prior to being provided back to the equalizer.

9. A method comprising:
receiving, by a communications terminal, a signal transmitted over a wireless channel via a high-power amplifier of a transponder, wherein the received signal comprises a discrete carrier signal of a respective carrier phase and frequency, and wherein the carrier signal reflects a plurality of source data symbols of a respective source signal with which it was modulated, and wherein the carrier signal includes inter-symbol interference (ISI) effects induced based on a faster-than-Nyquist (FTN) signaling rate and a tight frequency roll-off applied to the respective source signal for transmission over the wireless channel;

sampling the carrier signal at the FTN signaling rate to generate a sequence of sampled estimates of the source data symbols of the respective source signal; and processing the sequence of sampled source data symbol estimates to determine original source data symbols of the respective source signal;

wherein the processing of the sequence of sampled source data symbol estimates comprises:
equalizing the sequence of sampled source data symbol estimates to compensate for the ISI effects induced based on the FTN signaling rate and the tight frequency roll-off applied to the source signal; and
decoding an output of the equalizing step to determine and regenerate the respective source signal.

10. The method according to claim 9, wherein the FTN signaling rate is approximately 6% and the tight frequency roll-off is approximately 5%.

11. The method according to claim 9, wherein, in compensating for the ISI effects induced by the FTN signaling rate and tight frequency roll-off, the equalizing of the received signal comprises:
utilizing a priori soft information of every code bit for the carrier on which the source signal was transmitted.

12. The method according to claim 11, wherein the a priori soft information comprises log-likelihood ratios (LLRs).

13. The method according to claim 11, wherein the decoding of the output of the equalizing step comprises:
generating a set of a posteriori log-likelihood ratios (LLRs) based on the output of the equalizing step, wherein the a priori soft information utilized in the equalizing step comprises the a posteriori LLRs generated by the decoding of the output of the equalizing step.

14. The method according to claim 11, wherein, in compensating for the ISI effects induced by the FTN signaling rate and tight frequency roll-off, the processing of the received signal comprises decoding the received signal via a plurality of processing iterations, and wherein:

for a one processing iteration, the decoding of the output of the equalizing step comprises generating a set of a posteriori soft information based on the output of the equalizing step; and for a processing iteration subsequent to the one processing iteration, the a priori soft information utilized in the equalizing step comprises the a posteriori soft information generated by the decoding of the output of the equalizing step for the one processing iteration.

15. The method according to claim 11, wherein, in compensating for the ISI effects induced by the FTN signaling rate and tight frequency roll-off, the processing of the received signal comprises decoding the received signal via a plurality of processing iterations, and wherein the method further comprises:

for a one processing iteration, generating a set of a posteriori log-likelihood ratios (LLRs) based on the output of the equalizing step, and decoding the a posteriori LLRs; and wherein, for a processing iteration subsequent to the one processing iteration, the a priori soft information utilized in the equalizing step comprises the decoded a posteriori LLRs from the one decoding iteration.

16. The method according to claim 15, further comprising:

deinterleaving the a posteriori LLRs before being decoded; and interleaving the decoded a posteriori LLRs prior to being utilized in the equalizing step.

17. The method according to claim 9, wherein the carrier signal reflects the plurality of source data symbols of the respective source signal with which it was modulated wherein the modulation was based on an 8-ary, 1+7APSK signal constellation, including an outer ring with 7 bit positions, in accordance with the following bit labeling and [x, y] bit coordinate positions:

| Bit Label | [x, y] Coordinates |
|---|---|
| 000 | [0.0, 0.0] |
| 001 | [$\sqrt{(8.0 * \epsilon_x/7.0}$, 0.0] |
| 010 | [$\sqrt{8.0 * \epsilon_x/7.0}$ * cos(4.0 * π/7.0), $\sqrt{8.0 * \epsilon_x/7.0}$ * sin(4.0 * π/7.0)] |
| 011 | [$\sqrt{8.0 * \epsilon_x/7.0}$ * cos(2.0 * π/7.0), $\sqrt{8.0 * \epsilon_x/7.0}$ * sin(2.0 * π/7.0)] |
| 100 | [$\sqrt{8.0 * \epsilon_x/7.0}$ * cos(12.0 * π/7.0), $\sqrt{8.0 * \epsilon_x/7.0}$ * sin(12.0 * π/7.0)] |
| 101 | [$\sqrt{8.0 * \epsilon_x/7.0}$ * cos(10.0 * π/7.0), $\sqrt{8.0 * \epsilon_x/7.0}$ * sin(10.0 * π/7.0)] |
| 110 | [$\sqrt{8.0 * \epsilon_x/7.0}$ * cos(6.0 * π/7.0), $\sqrt{8.0 * \epsilon_x/7.0}$ * sin(6.0 * π/7.0)] |
| 111 | [$\sqrt{8.0 * \epsilon_x/7.0}$ * cos(8.0 * π/7.0), $\sqrt{8.0 * \epsilon_x/7.0}$ * sin(8.0 * π/7.0)] | where $\epsilon_x$ represents average energy per symbol, and wherein each of the [x, y] bit coordinate positions is rotated by a same rotation factor (from 0 to 359°, inclusive), and/or each bit label is altered by interchanging the 0's and 1's, and/or a uniform swapping of bit positions is applied within each bit label.

18. The method according to claim 9, wherein the carrier signal reflects the plurality of source data symbols of the respective source signal with which it was modulated wherein the modulation is based on a 16-ary, 6+10APSK signal constellation, including an inner ring with 6 bit positions and an outer ring with 10 bit positions, in accordance with the following bit labeling and [x, y] bit coordinate positions:

| Bit Label | [x, y] Coordinates |
|---|---|
| 0000 | [R1* $\sqrt{\epsilon_x}$, 0.0] |
| 0001 | [R1 * $\sqrt{\epsilon_x}$ * cos(5.0 * π/3.0), R1 * $\sqrt{\epsilon_x}$ * sin(5.0 * π/3.0)] |
| 0010 | [R1 * $\sqrt{\epsilon_x}$ * cos(π/3.0), R1 * $\sqrt{\epsilon_x}$ * sin(π/3.0)] |
| 0011 | [R2 * $\sqrt{\epsilon_x}$ * cos(13.0 * π/30.0), R2 * $\sqrt{\epsilon_x}$ * sin(13.0 * π/30.0)] |
| 0100 | [R2 * $\sqrt{\epsilon_x}$ * cos(55.0 * π/30.0), R2 * $\sqrt{\epsilon_x}$ * sin(55.0 * π/30.0)] |
| 0101 | [R2 * $\sqrt{\epsilon_x}$ * cos(49.0 * π/30.0), R2 * $\sqrt{\epsilon_x}$ * sin(49.0 * π/30.0)] |
| 0110 | [R2 * $\sqrt{\epsilon_x}$ * cos(π/30.0), R2 * $\sqrt{\epsilon_x}$ * sin(π/30.0)] |
| 0111 | [R2 * $\sqrt{\epsilon_x}$ * cos(7.0 * π/30.0), R2 * $\sqrt{\epsilon_x}$ * sin(7.0 * π/30.0)] |
| 1000 | [−R1* $\sqrt{\epsilon_x}$, 0.0] |
| 1001 | [R1 * $\sqrt{\epsilon_x}$ * cos(4.0 * π/3.0), R1 * $\sqrt{\epsilon_x}$ * sin(4.0 * π/3.0)] |
| 1010 | [R1 * $\sqrt{\epsilon_x}$ * cos(2.0 * π/3.0), R1 * $\sqrt{\epsilon_x}$ * sin(2.0 * π/3.0)] |
| 1011 | [R2 * $\sqrt{\epsilon_x}$ * cos(19.0 * π/30.0), R2 * $\sqrt{\epsilon_x}$ * sin(19.0 * π/30.0)] |
| 1100 | [R2 * $\sqrt{\epsilon_x}$ * cos(37.0 * π/30.0), R2 * $\sqrt{\epsilon_x}$ * sin(37.0 * π/30.0)] |
| 1101 | [R2 * $\sqrt{\epsilon_x}$ * cos(43.0 * π/30.0), R2 * $\sqrt{\epsilon_x}$ * sin(43.0 * π/30.0)] |
| 1110 | [R2 * $\sqrt{\epsilon_x}$ * cos(31.0 * π/30.0), R2 * $\sqrt{\epsilon_x}$ * sin(31.0 * π/30.0)] |
| 1111 | [R2 * $\sqrt{\epsilon_x}$ * cos(25.0 * π/30.0), R2 * $\sqrt{\epsilon_x}$ * sin(25.0 * π/30.0)] | where $\epsilon_x$ represents average energy per symbol, $6*R1^2 + 10*R2^2 = 16$, and R1 represents the radius of the inner ring and R2 represents the radius of the outer ring, and wherein each of the [x, y] bit coordinate positions is rotated by a same rotation factor (from 0 to 359°, inclusive), and/or each bit label is altered by interchanging the 0's and 1's, and/or a uniform swapping of bit positions is applied within each bit label.

19. The method according to claim 9, wherein the carrier signal reflects the plurality of source data symbols of the respective source signal with which it was modulated wherein the modulation is based on a 32-ary, 4+12+16APSK signal constellation, including an inner ring with 4 bit positions, a middle ring with 12 bit positions and an outer ring with 16 bit positions, in accordance with the following bit labeling and [x, y] bit coordinate positions:

| Bit Label | [x, y] Coordinates |
|---|---|
| 00000 | [−R3 * $\sqrt{\epsilon_x}$ * cos(5.0 * π/16.0), R3 * $\sqrt{\epsilon_x}$ * cos(3.0 * π/16.0)] |
| 00001 | [−R3 * $\sqrt{\epsilon_x}$ * cos(7.0 * π/16.0), R3 * $\sqrt{\epsilon_x}$ * cos(π/16.0)] |
| 00010 | [R3 * $\sqrt{\epsilon_x}$ * cos(5.0 * π/16.0), R3 * $\sqrt{\epsilon_x}$ * cos(3.0 * π/16.0)] |
| 00011 | [R3 * $\sqrt{\epsilon_x}$ * cos(7.0 * π/16.0), R3 * $\sqrt{\epsilon_x}$ * cos(π/16.0)] |
| 00100 | [−R2 * $\sqrt{\epsilon_x}$ * sin(π/4.0), R2 * $\sqrt{\epsilon_x}$ * sin(π/4.0)] |
| 00101 | [−R2 * $\sqrt{\epsilon_x}$ * sin(π/12.0), R2 * $\sqrt{\epsilon_x}$ * sin(5.0 * π/12.0)] |
| 00110 | [R2 * $\sqrt{\epsilon_x}$ * sin(π/4.0), R2 * $\sqrt{\epsilon_x}$ * sin(π/4.0)] |
| 00111 | [R2 * $\sqrt{\epsilon_x}$ * sin(π/12.0), R2 * $\sqrt{\epsilon_x}$ * sin(5.0 * π/12.0)] |
| 01000 | [−R3 * $\sqrt{\epsilon_x}$ * cos(3.0 * π/16.0), R3 * $\sqrt{\epsilon_x}$ * cos(5.0 * π/16.0)] |
| 01001 | [−R3 * $\sqrt{\epsilon_x}$ * cos(π/16.0), R3 * $\sqrt{\epsilon_x}$ * cos(7.0 * π/16.0)] |
| 01010 | [R3 * $\sqrt{\epsilon_x}$ * cos(3.0 * π/16.0), R3 * $\sqrt{\epsilon_x}$ * cos(5.0 * π/16.0)] |
| 01011 | [R3 * $\sqrt{\epsilon_x}$ * cos(π/16.0), R3 * $\sqrt{\epsilon_x}$ * cos(7.0 * π/16.0)] |
| 01100 | [−R2 * $\sqrt{\epsilon_x}$ * sin(5.0 * π/12.0), R2 * $\sqrt{\epsilon_x}$ * sin(π/12.0)] |
| 01101 | [−R1 * $\sqrt{\epsilon_x}$ * sin(π/4.0), R1 * $\sqrt{\epsilon_x}$ * sin(π/4.0)] |
| 01110 | [R2 * $\sqrt{\epsilon_x}$ * sin(5.0 * π/12.0), R2 * $\sqrt{\epsilon_x}$ * sin(π/12.0)] |
| 01111 | [R1 * $\sqrt{\epsilon_x}$ * sin(π/4.0), R1 * $\sqrt{\epsilon_x}$ * sin(π/4.0)] |
| 10000 | [−R3 * $\sqrt{\epsilon_x}$ * cos(5.0 * π/16.0), −R3 * $\sqrt{\epsilon_x}$ * cos(3.0 * π/16.0)] |
| 10001 | [−R3 * $\sqrt{\epsilon_x}$ * cos(7.0 * π/16.0), −R3 * $\sqrt{\epsilon_x}$ * cos(π/16.0)] |
| 10010 | [R3 * $\sqrt{\epsilon_x}$ * cos(5.0 * π/16.0), −R3 * $\sqrt{\epsilon_x}$ * cos(3.0 * π/16.0)] |
| 10011 | [R3 * $\sqrt{\epsilon_x}$ * cos(7.0 * π/16.0), −R3 * $\sqrt{\epsilon_x}$ * cos(π/16.0)] |
| 10100 | [−R2 * $\sqrt{\epsilon_x}$ * sin(π/4.0), −R2 * $\sqrt{\epsilon_x}$ * sin(π/4.0)] |
| 10101 | [−R2 * $\sqrt{\epsilon_x}$ * sin(π/12.0), −R2 * $\sqrt{\epsilon_x}$ * sin(5.0 * π/12.0)] |
| 10110 | [R2 * $\sqrt{\epsilon_x}$ * sin(π/4.0), −R2 * $\sqrt{\epsilon_x}$ * sin(π/4.0)] |
| 10111 | [R2 * $\sqrt{\epsilon_x}$ * sin(π/12.0), −R2 * $\sqrt{\epsilon_x}$ * sin(5.0 * π/12.0)] |
| 11000 | [−R3 * $\sqrt{\epsilon_x}$ * cos(3.0 * π/16.0), −R3 * $\sqrt{\epsilon_x}$ * cos(5.0 * π/16.0)] |

-continued

| Bit Label | [x, y] Coordinates |
|---|---|
| 11001 | [−R3 * $\sqrt{\epsilon_x}$ * cos(π/16.0), −R3 * $\sqrt{\epsilon_x}$ * cos(7.0 * π/16.0)] |
| 11010 | [R3 * $\sqrt{\epsilon_x}$ * cos(3.0 * π/16.0), −R3 * $\sqrt{\epsilon_x}$ * cos(5.0 * π/16.0)] |
| 11011 | [R3 * $\sqrt{\epsilon_x}$ * cos(π/16.0), −R3 * $\sqrt{\epsilon_x}$ * cos(7.0 * π/16.0)] |
| 11100 | [−R2 * $\sqrt{\epsilon_x}$ * sin(5.0 * π/12.0), −R2 * $\sqrt{\epsilon_x}$ * sin(π/12.0)] |
| 11101 | [−R1 * $\sqrt{\epsilon_x}$ * sin(π/4.0), −R1 * $\sqrt{\epsilon_x}$ * sin(π/4.0)] |
| 11110 | [R2 * $\sqrt{\epsilon_x}$ * sin(5.0 * π/12.0), −R2 * $\sqrt{\epsilon_x}$ * sin(π/12.0)] |
| 11111 | [R1 * $\sqrt{\epsilon_x}$ * sin(π/4.0), −R1 * $\sqrt{\epsilon_x}$ * sin(π/4.0)] | where $\epsilon_x$ represents average energy per symbol, $4*R1^2 + 12*R2^2 + 16*R3^2 = 32$, and R1 represents the radius of the inner ring, R2 represents the radius of the middle ring and R3 represents the radius of the outer ring, and wherein each of the [x, y] bit coordinate positions is rotated by a same rotation factor (from 0 to 359°, inclusive), and/or each bit label is altered by interchanging the 0's and 1's, and/or a uniform swapping of bit positions is applied within each bit label.

* * * * *